US008194043B2

(12) United States Patent
Cheon et al.

(10) Patent No.: US 8,194,043 B2
(45) Date of Patent: Jun. 5, 2012

(54) MOBILE COMMUNICATION TERMINAL HAVING MULTIPLE DISPLAYS AND A DATA PROCESSING METHOD THEREOF

(75) Inventors: Jee-Young Cheon, Daegu (KR); Yeon-Woo Park, Seoul (KR); Sang-Hyuck Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 88 days.

(21) Appl. No.: 11/535,471

(22) Filed: Sep. 26, 2006

(65) Prior Publication Data

US 2007/0075915 A1 Apr. 5, 2007

(30) Foreign Application Priority Data

Sep. 26, 2005 (KR) .......................... 10-2005-0089298

(51) Int. Cl.
*G09G 5/00* (2006.01)
(52) U.S. Cl. ........ 345/173; 345/174; 345/175; 345/177; 345/178; 345/179; 345/1.1; 345/1.2; 345/1.3
(58) Field of Classification Search .......... 345/173–179, 345/1.1–1.3
See application file for complete search history.

(56) References Cited

U.S. PATENT DOCUMENTS

| | | | |
|---|---|---|---|
| 5,467,102 A | 11/1995 | Kuno et al. | |
| 5,559,301 A * | 9/1996 | Bryan et al. | 84/653 |
| 5,729,249 A * | 3/1998 | Yasutake | 345/173 |
| 5,889,236 A * | 3/1999 | Gillespie et al. | 178/18.01 |
| 6,331,840 B1 * | 12/2001 | Nielson et al. | 345/1.1 |
| 6,545,669 B1 * | 4/2003 | Kinawi et al. | 345/173 |
| 6,564,121 B1 * | 5/2003 | Wallace et al. | 700/231 |
| 6,603,708 B2 * | 8/2003 | Tamagawa et al. | 368/10 |
| 7,170,492 B2 * | 1/2007 | Bell | 345/158 |
| 7,313,526 B2 * | 12/2007 | Roth et al. | 704/270 |
| 7,441,202 B2 * | 10/2008 | Shen et al. | 715/769 |
| 7,600,201 B2 * | 10/2009 | Endler et al. | 715/863 |
| 2002/0063518 A1 | 5/2002 | Okamoto et al. | |
| 2003/0100347 A1 | 5/2003 | Okada et al. | |
| 2004/0046796 A1 * | 3/2004 | Fujita | 345/767 |
| 2004/0056839 A1 * | 3/2004 | Yoshihara | 345/156 |
| 2004/0205504 A1 | 10/2004 | Phillips | |
| 2006/0034042 A1 * | 2/2006 | Hisano et al. | 361/681 |
| 2010/0265174 A1 * | 10/2010 | Smith et al. | 345/157 |
| 2011/0082741 A1 * | 4/2011 | Boal | 705/14.39 |

FOREIGN PATENT DOCUMENTS

| | | |
|---|---|---|
| CN | 1270468 | 10/2000 |
| CN | 1337618 | 2/2002 |
| CN | 2600981 | 1/2004 |
| EP | 0898223 | 2/1999 |
| JP | 6-044001 | 2/1994 |
| KR | 10-2005-0016148 A | 2/2005 |
| KR | 10-2005-0016149 A | 2/2005 |

* cited by examiner

*Primary Examiner* — Nitin Patel
*Assistant Examiner* — Leonid Shapiro
(74) *Attorney, Agent, or Firm* — Lee, Hong, Degerman, Kang & Waimey

(57) ABSTRACT

A mobile communication terminal includes a display unit comprising a plurality of displays, one of which being formed as a touch panel, and a controller for analyzing a signal inputted through the touch panel to determine whether movement distance of data satisfies pre-set conditions, and outputting a control signal for displaying the corresponding data through a different display region according to the corresponding result.

15 Claims, 25 Drawing Sheets

MOBILE COMMUNICATION TERMINAL HAVING MULTIPLE DISPLAYS AND A DATA PROCESSING METHOD THEREOF

CROSS REFERENCE TO RELATED APPLICATION

Pursuant to 35 U.S.C. §119(a), this application claims the benefit of earlier filing date and right of priority to Korean Application No. 10-2005-0089298, filed Sep. 26, 2005, the contents of which are hereby incorporated by reference herein in their entirety.

BACKGROUND OF THE INVENTION

1. Field of the Invention

The present invention relates to a mobile communication terminal and, more particularly, to a method for moving data between two or more displays, each of which implements a different operation, and a mobile communication terminal employing the method.

2. Description of the Related Art

Various types of mobile communication terminals have been developed in line with the advancement of technologies and consumers' demands. Recently, mobile communication terminals can be divided into folder type terminals and slide type terminals. As the folder type terminals, dual LCD folder type mobile communication terminals which have LCD units provided on both sides of an upper folder are widely used.

FIG. 1 is a perspective view showing the exterior of the dual LCD folder type mobile communication terminal, and FIG. 2 is a perspective view showing the exterior of the dual LCD folder type mobile communication terminal when its folder is opened. The dual LCD folder type mobile communication terminal 100 includes a sub-LCD 110 provided at an outer side of an upper folder 101 and an internal main LCD 120 provided at an inner side of the upper folder 101.

As illustrated, the sub-LCD 110 has a relatively smaller screen in size than the main LCD 120. The sub-LCD 110 is provided to display basic information in an idle state, promoting users convenience. For example, it displays field strength, remaining battery capacity, time and date on one screen. In addition, an icon informing of an incoming call or corresponding simple message content when the dual LCD type mobile communication terminal receives a call can be displayed on the sub-LCD 110. In this state, when a user opens the upper folder 101 as shown in FIG. 2, a call can be connected, and in addition, when a message such as a text message is received by the mobile communication terminal, an icon informing of the message reception or corresponding short message content can be displayed on the sub-LCD 110. In this case, when the user opens the upper folder 101, the received message can be displayed on the main LCD 120. If the user does not immediately open the upper folder, the icon informing of the arrival of reception message is continuously displayed on the sub-LCD.

Meanwhile, a mobile communication terminal 200, which has a structure that a main LCD 210 is provided on an upper folder 210 and a touch panel 220 is provided on a lower folder 202 as shown in FIG. 3, has been presented. Generally, the touch panel 220 installed at a corresponding portion where a keypad is to be formed can display the keypad as shown in FIG. 4 as necessary. Namely, the touch panel 220 can output an image of the navigation keys 221 and number keys 222 and perform the same function as that of the general keypad upon receiving signals inputted therethrough. The mobile communication terminal with such a structure can solve a problem that may arise when the LCD is provided at an outer side and also resolve user inconvenience caused by a small image display region. When an installed file search function is executed by using the mobile communication terminal, a stored data list is displayed. A folder or a file of the displayed data can be executed or selected on the touch panel directly from a file explorer by using a stylus pen. In this respect, however, the function of the stylus pen is limited in its inputting to such as tapping, double tapping, dragging & dropping.

The dragging & dropping is used to copy or move a file. Namely, two file searches are executed on each display and a file desired to be copied is selected from one file explorer. A target folder is displayed on a display window of the other file searches and the selected file is dragged and dropped to the target folder.

However, the copying method can be possibly used only when the target folder and the filed to be copied are positioned together on the same screen, and in a state that the displays are separately divided, the dragging & dropping method cannot be used.

In an effort to solve the problem, an end portion recognition technique is favorably employed. Namely, in case where data is copied or moved from one display to another display, when a dragging reaches an end portion, the data is moved or copied to the other display. However, application of this technique requires a complicate algorithm. In addition, in case that a menu or an icon is positioned far from an end portion, the menu or the icon must be moved (dragged) up to the end portion for user inconvenience.

BRIEF DESCRIPTION OF THE INVENTION

One aspect of the present invention involves the recognition by the present inventors of the drawbacks in the related art, as explained above. Based upon such recognition, improvements in processing data between display regions can be achieved according to the present invention.

Certain features that may be part of the data processing method and system between display regions will not be described in much detail, merely to prevent the characteristics of the present invention from being obscured. However, such additional features may also be part of the data processing method and system of the present invention, as would be understood by those skilled in the art.

Therefore, one object of the present invention is to provide a mobile communication terminal capable of processing data copying and/or data moving between display regions, and a data display method using the same.

Another object of the present invention is to provide a mobile communication terminal capable of sufficiently utilizing two display regions, and a data display method using the same.

Still another object of the present invention is to provide a mobile communication terminal capable of easily classifying stored data, and a data display method using the same.

Yet another object of the present invention is to provide a mobile communication terminal capable of easily checking stored data through a simple manipulation, and a data display method using the same.

One exemplary feature of the present invention is to provide a mobile communication terminal in which data selected from a touch panel can be moved or copied to another display without employing an end portion recognition technique.

Another exemplary feature of the present invention is to provide a mobile communication terminal in which a control signal using a touch panel displaying a data list is analyzed and then moved to another display.

Hereinafter, the term 'terminal' is intended to refer to and cover various types of communication devices that support mobility (or may be fixed) and allows communication of information via wired and/ore wireless interfaces. Examples may include mobile stations, user equipment (UE), handsets or PDAs, etc.

To implement at least the above feature in whole or in parts, the present invention provides a mobile communication terminal comprising: a display unit having a plurality of displays, one of displays being formed as a touch panel; and a controller for analyzing a signal inputted through the touch panel to check whether movement conditions of data displayed on the touch panel are satisfied, and outputting a control signal for displaying the corresponding data on a different display region.

To achieve at least these advantages in whole or in parts, the present invention also provides a data display method of a mobile communication terminal having a display unit including a plurality of displays, one of the plurality of displays being formed as a touch panel, comprising: analyzing a signal inputted through the touch panel to check whether movement conditions of data are satisfied; and displaying the corresponding data on a different display region.

The data display method of a mobile communication terminal further comprises checking whether data selected through the touch panel can be movable.

In the data display method of a mobile communication terminal, data is moved based on a dragging direction using the touch panel.

In the data display method of a mobile communication terminal, the movement conditions are determined based on a movement speed of the pointing device in contact with the touch panel, the length of contact on the touch panel, and pressure applied to the touch panel for more than a certain time.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention, are incorporated in and constitute a part of the application, illustrate embodiment(s) of the invention and together with the description serve to explain the principle of the invention. In the drawings:

FIGS. 7a to 7j show various examples of outputting data on the touch panel through a different display in accordance with the present invention;

DETAILED DESCRIPTION OF THE INVENTION

Figure 1:
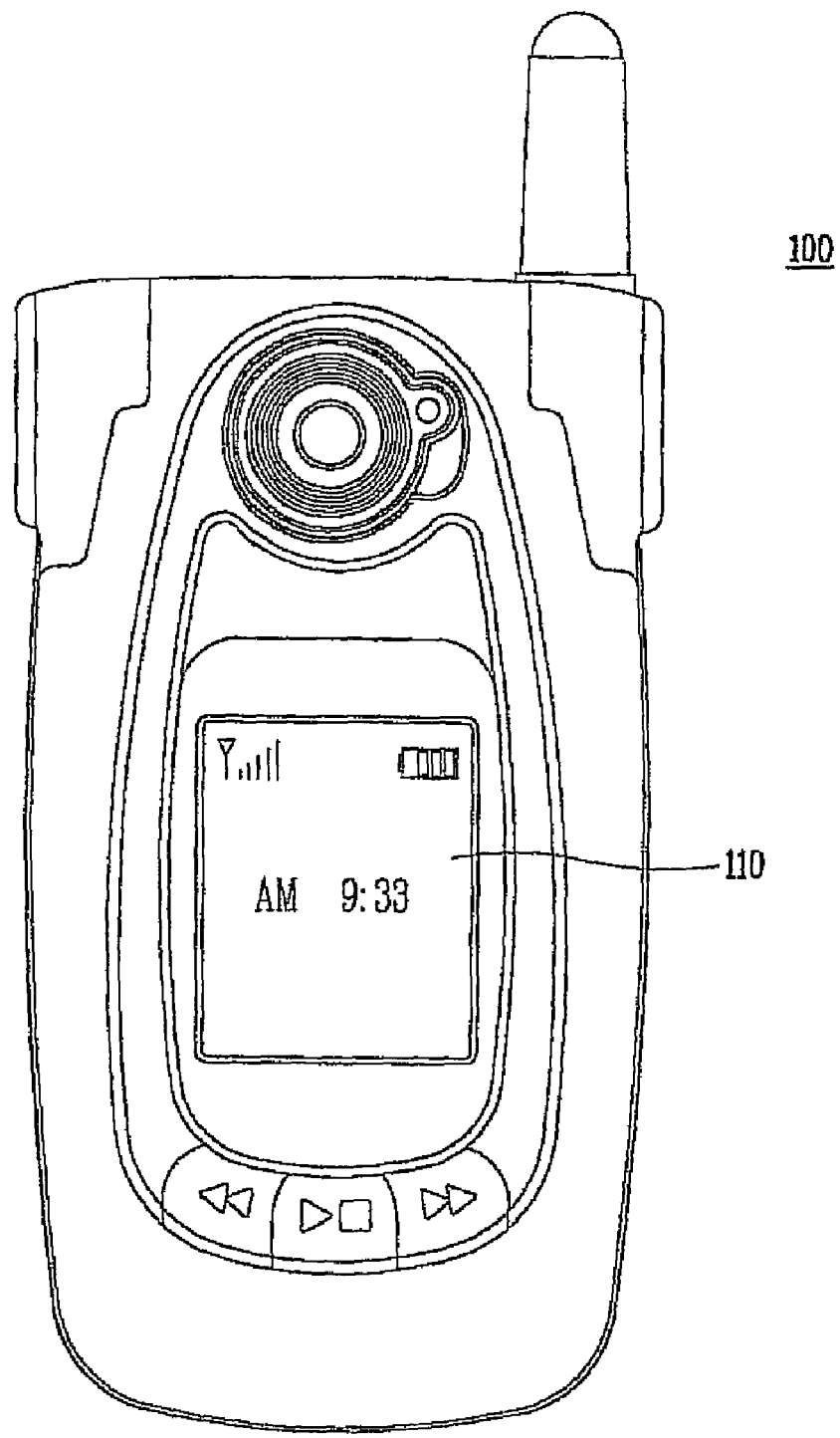
FIG. 1 is a perspective view showing the exterior of a dual LCD folder type mobile communication terminal in accordance with a related art.
Figure 2:
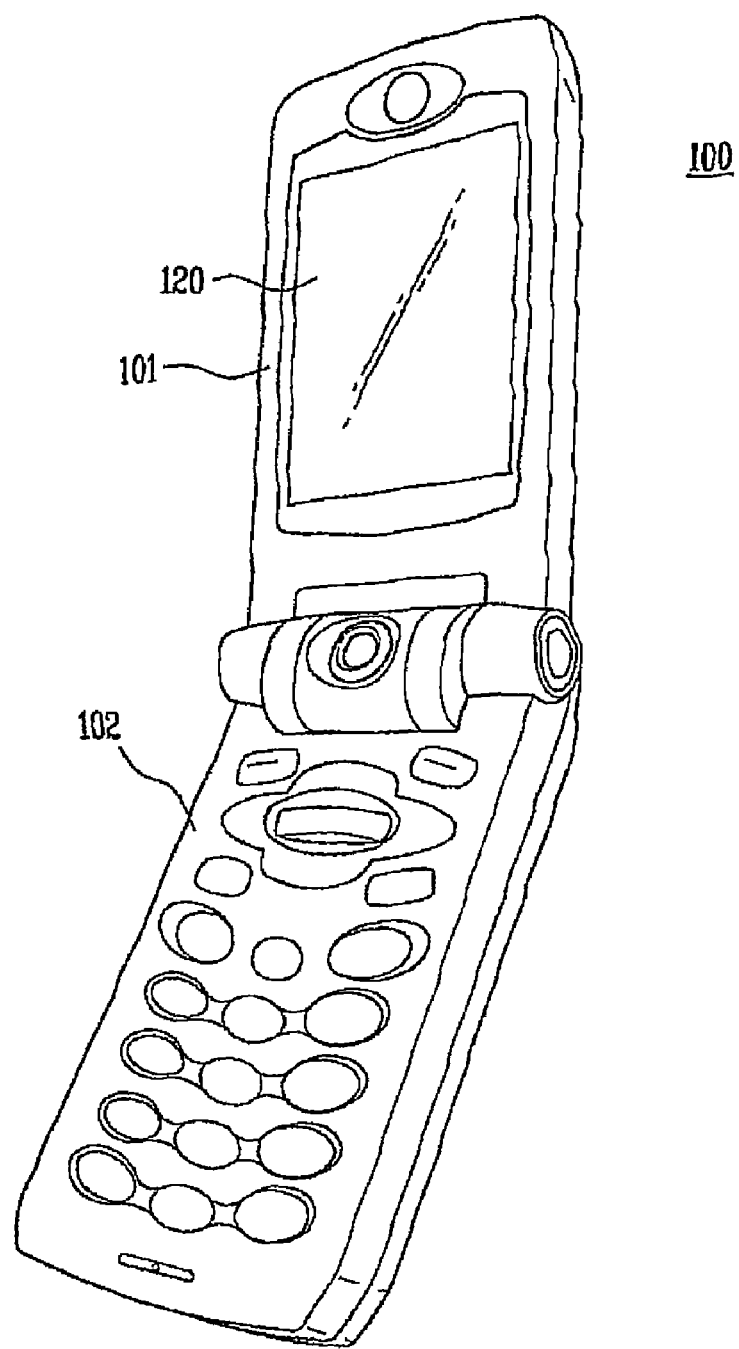
FIG. 2 is a perspective view showing the exterior of the dual LCD folder type mobile communication when it is opened in accordance with the related art.
Figure 3:
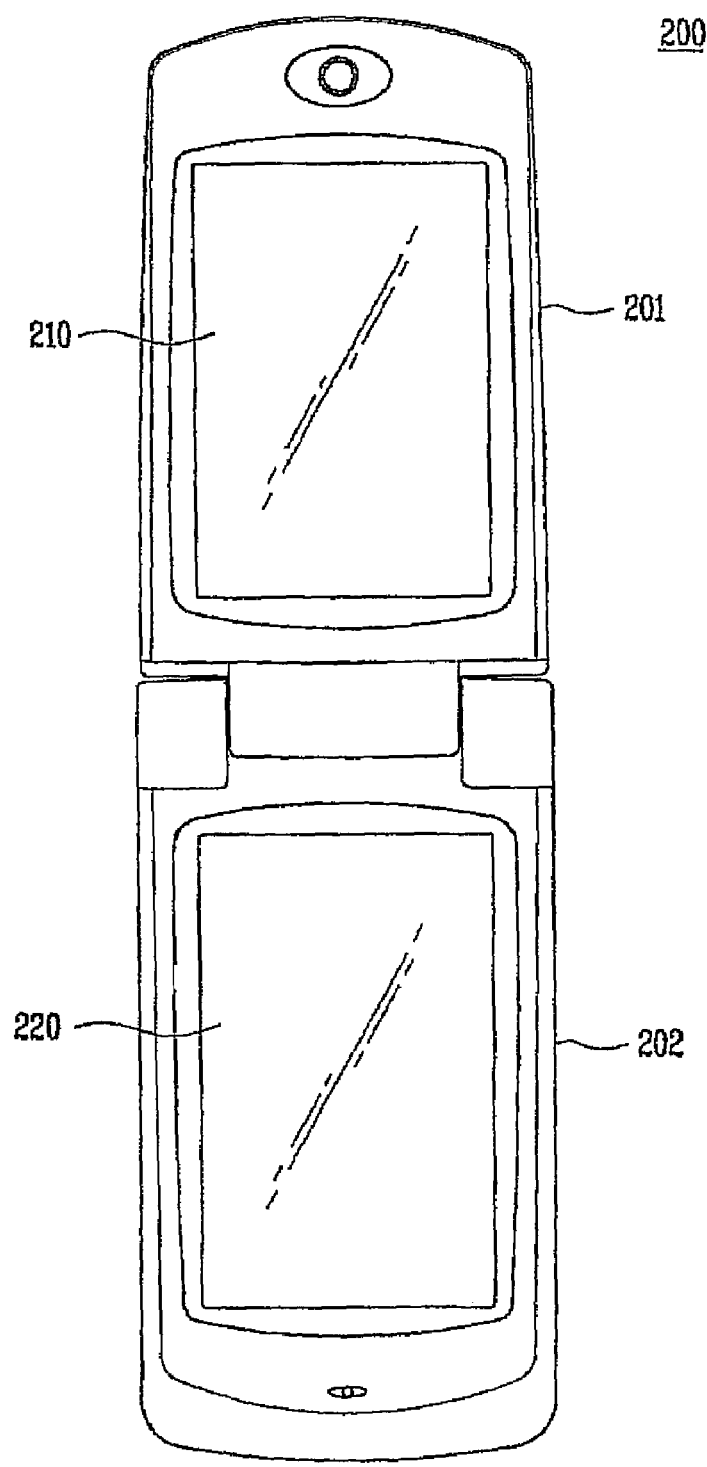
FIG. 3 is a schematic block diagram showing the construction of a mobile communication terminal in accordance with the present invention.
Figure 4:
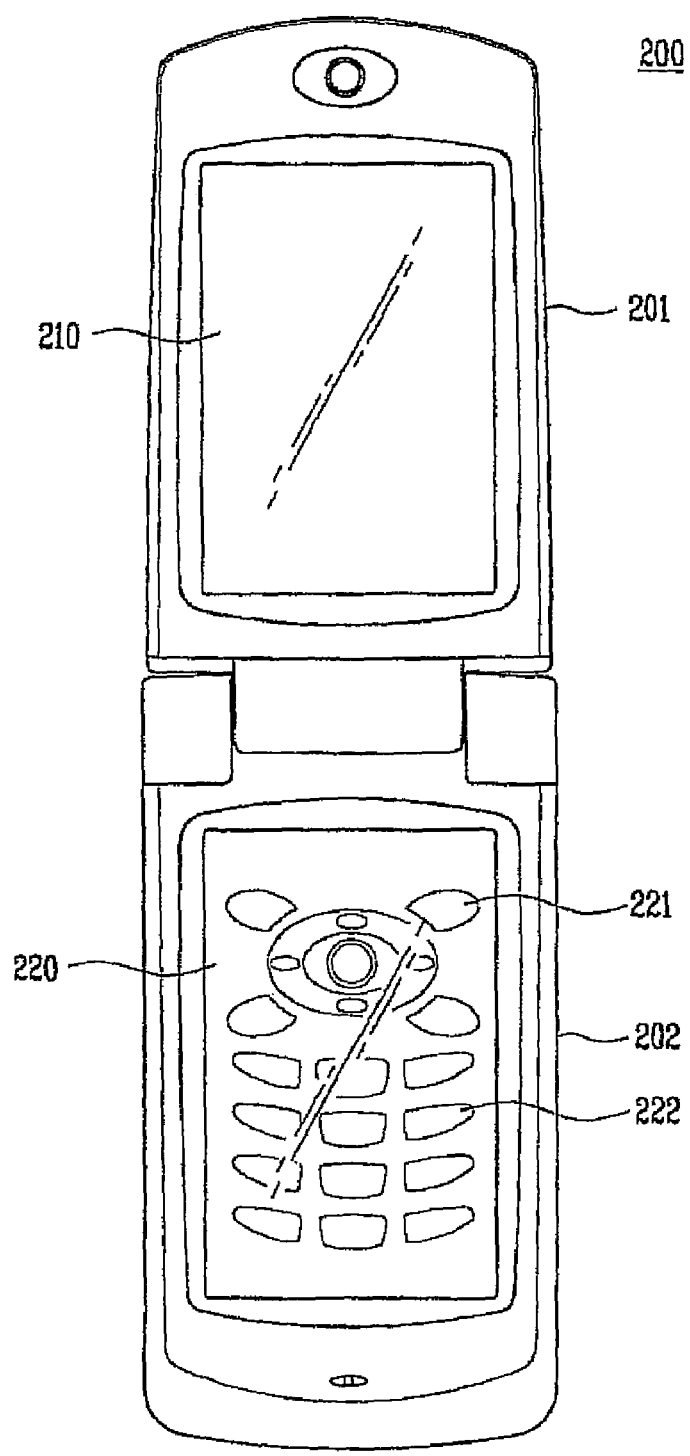
FIG. 4 is an exemplary view showing a keypad displayed on a touch panel formed at a lower folder in FIG. 3.
Figure 5:
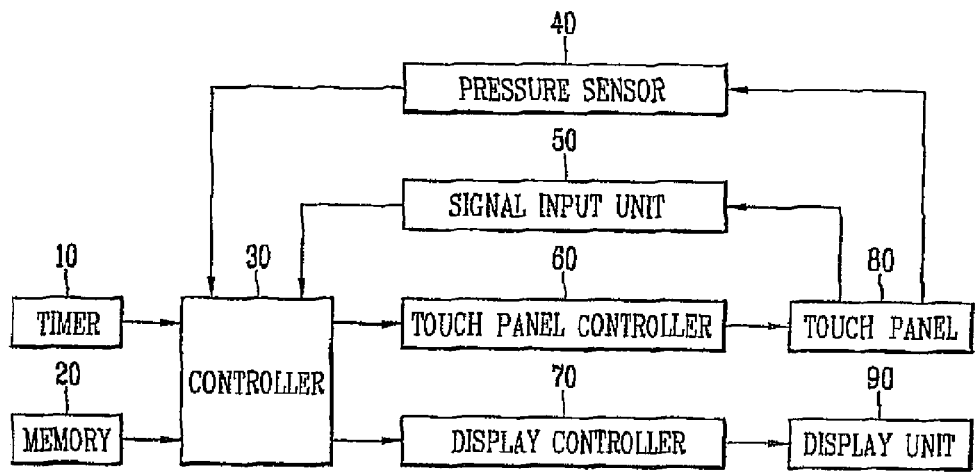
FIG. 5 is a schematic block diagram showing the construction of the mobile communication terminal in accordance with the present invention.

FIG. 5 is a schematic block diagram showing the construction of the mobile communication terminal in accordance with the present invention.

The mobile communication terminal in accordance with the present invention includes: a display unit 90 for performing a general display function of a mobile communication terminal, a touch panel 80 formed with a certain distance from the display unit 90, a memory 20 storing various information, a touch panel controller 60 controlling driving of the touch panel 80; a display controller 70 for controlling driving of the display unit 90; a signal input unit 50 for converting a signal inputted through the touch panel 80 into an electrical signal and outputting it; a controller 30 for outputting a control signal corresponding to the input signal provided through the signal input unit 50; a timer 10 for providing a drive time information required for controlling of the controller 30; and a pressure sensor 40 for sensing pressure applied to the touch panel 80 and providing information on the sensed pressure to the controller 30.

The touch panel 80 displays a list of data stored in the memory 20 according to a control signal. The signal inputted through the touch panel 80 is transferred to the controller 30 via the signal input unit 50. The controller 30 analyzes the input signal. If movement conditions of data are met, the controller outputs a control signal for outputting corresponding data through the display unit 90.

In the construction of the present invention, one of the two display units is the touch panel, but in order to accomplish the objects of the present invention at least one or more display regions can be formed as the touch panel. Namely, two displays can be all the touch panels, and two or more display units can be formed in addition to the touch panel.

Also, various types of memory means, such as RAMs, ROMs, hard disk type memories, flash memories, a GRAM (Graphic Random Access Memory), an SGAM (Synchronous Graphic Random Access Memory), etc., can be also applied to store the moved or copied image for different types of image data (e.g., SMS (Short Message Service), an MMS (Multimedia Message Service), a graphic message, a DMB (Digital Multimedia Broadcasting), etc.

In the exemplary embodiment of the present invention, the touch panel 220 is formed on the lower folder 202 and the display 210 is provided at the upper folder 201, but the opposite case can be also applicable according to the concept of the present invention. As well as the terminal including the upper folder and the lower folder centering on a hinge, the present invention can be also applied to a terminal whose upper folder is slidably moved up and down so long as it has at least two or more display regions.

For the sake of explanation, liquid crystal display (LCD) devices and systems will be described, but the present invention is not intended to be limited to LCDs, as various concepts of the present invention are applicable to a wide variety of other display devices or equipments. Examples may include LCD screens, organic electro-luminescence (EL) display screens, light emitting diode (LED) screens, OLED (Organic LED) screen, plasma display screens, etc.

Figure 6:
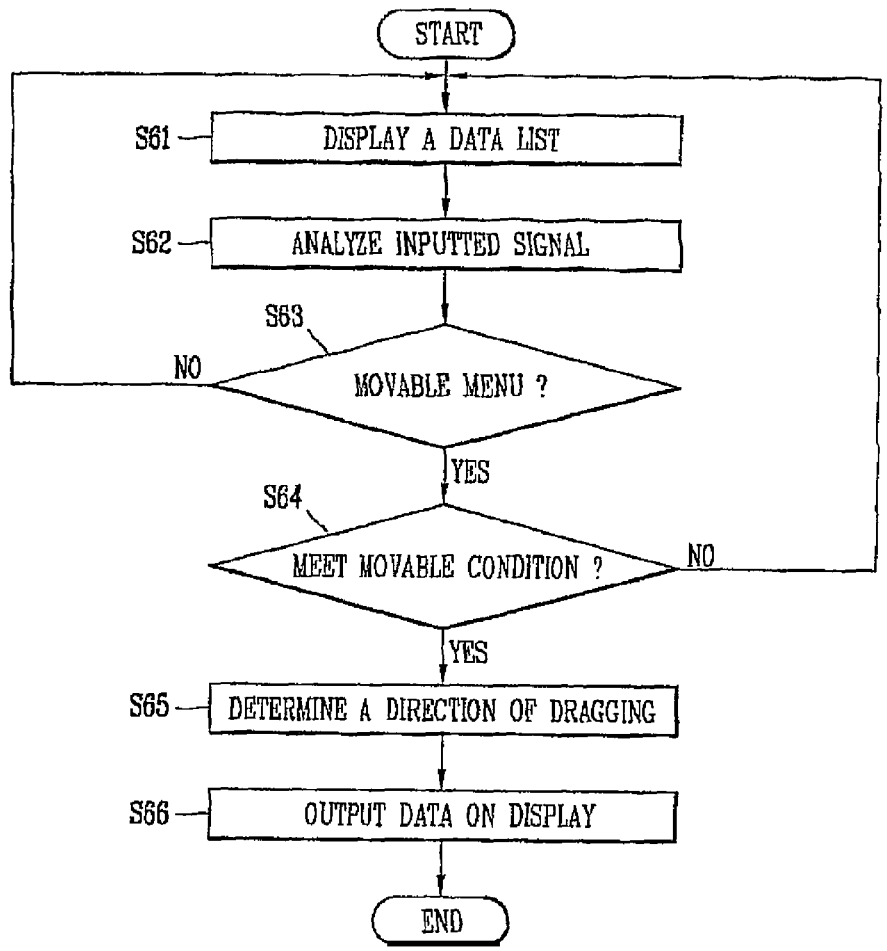
FIG. 6 is a flow chart illustrating the processes of a method for displaying data.

FIG. 6 is a flow chart illustrating the processes of a method for displaying data. Of the two separated display regions, data of the terminal is displayed on the touch panel 80. An output form of data can be a form of an icon, a menu, a folder or a file name (step S61).

A signal inputted through the touch panel is transferred to the controller 30 through the signal input unit 50. An icon can be selected by fingers or by using a stylus pen. The controller 30 analyzes the inputted signal (step S62), and checks whether a selected menu is a movable menu (or icon) (step S63).

If the selected menu is not a movable menu (or icon), the controller can output no message or an alert message informing a user that he/she has selected unmovable data. Here, the alert message may be provided in the form of an audible, visual, and/or tactile manner according to terminal's setup information.

If the user selected data is a movable menu or file, it is checked whether the signal inputted through the touch panel satisfies movement condition. In this case, there can be various types of movement conditions for allowing movement to be made without a procedure of recognizing an end portion. Also, there can be two types of operations of movement display. Namely, data on the touch panel 80 can be simply moved onto the display unit 90 and displayed in an enlarged or reproduced form, or data can be actually moved.

First, whether an inputted signal satisfies a movement condition or not can be determined based on a movement distance of data selected by contacting fingers or a pointing device such as the stylus pen on the touch panel 80. Namely, the length of drag is calculated, and if the calculated length of the drag satisfies a pre-set reference value, corresponding data is displayed on the display unit 90. That is, it refers to a case where the movement target data selected through the touch panel is dragged by longer than a pre-set length. In a related art, when data is copied or moved to another display, the data must be dragged up to a particular region, disadvantageously. In comparison, in the present invention, when data moves only by a certain length or longer, it is regarded as copying or movement. Thus, an operation for sensing the particular region is not necessary.

In a different condition, whether the inputted signal satisfies a movement condition or not can be determined based on the length of a region contacted on the touch panel. In a state that the stylus pen contacts on the touch panel, the pen is instantly moved for a short interval in a bouncing manner so an instantaneous speed exceeds a pre-set value. The instantaneous speed is calculated by the controller which has received the signal, which has been inputted through the touch panel, through the signal input unit. In this case, the instantaneous speed is calculated by using signals which have moved on the surface of the touch panel for a certain time. A movement speed is calculated by the controller based on movement information of the pointing device provided through the signal input unit and visual information provided by the timer. Namely, the movement speed is calculated through a movement locus of the pointing device for a certain time.

In a still different condition, pressure applied to the touch panel for a certain time is checked. Namely, an arbitrary menu or folder or a data file name displayed through the touch panel is pressed by pressure of above a determined level. The pressure sensor 40 senses the pressure applied onto the touch panel 80 and transfers it to the controller 30. When the pressure exceeding the certain pressure is continuously provided for a certain time, it is regarded as movement of corresponding data.

In a yet different condition, the number of times of pressing arbitrary data by the pointing device is checked. Each condition can be selected as a reference for determining movement, separately or collectively (step S64).

Thereafter, a direction of dragging is checked. The direction of dragging is calculated by using information on movement of the pointing device provided from the signal input unit. Namely, the direction of dragging can be calculated through a contact locus of the pointing device at each time point. In the case where the upper folder or the lower folder is divided into two display regions, the direction of dragging is an important factor because a target region for an icon to be moved can be changed. Movement can be made from the left to the right or from the right to the left, or can be made upwardly at a left display region or downwardly at a right display region. There can be many cases for them (step S65).

The controller outputs a control signal for moving data on the touch panel to a display region positioned in the dragging direction and displaying it based on the calculated information. The signal inputted through the touch panel 70 is transferred to the controller 30 through the signal input unit 50. Then, the controller analyzes the inputted signal and transfers a display control signal to the controller 70. Accordingly, the data of the corresponding folder can be displayed on the display 90 according to driving of the display controller 70 (step S66).

Figure 7A:
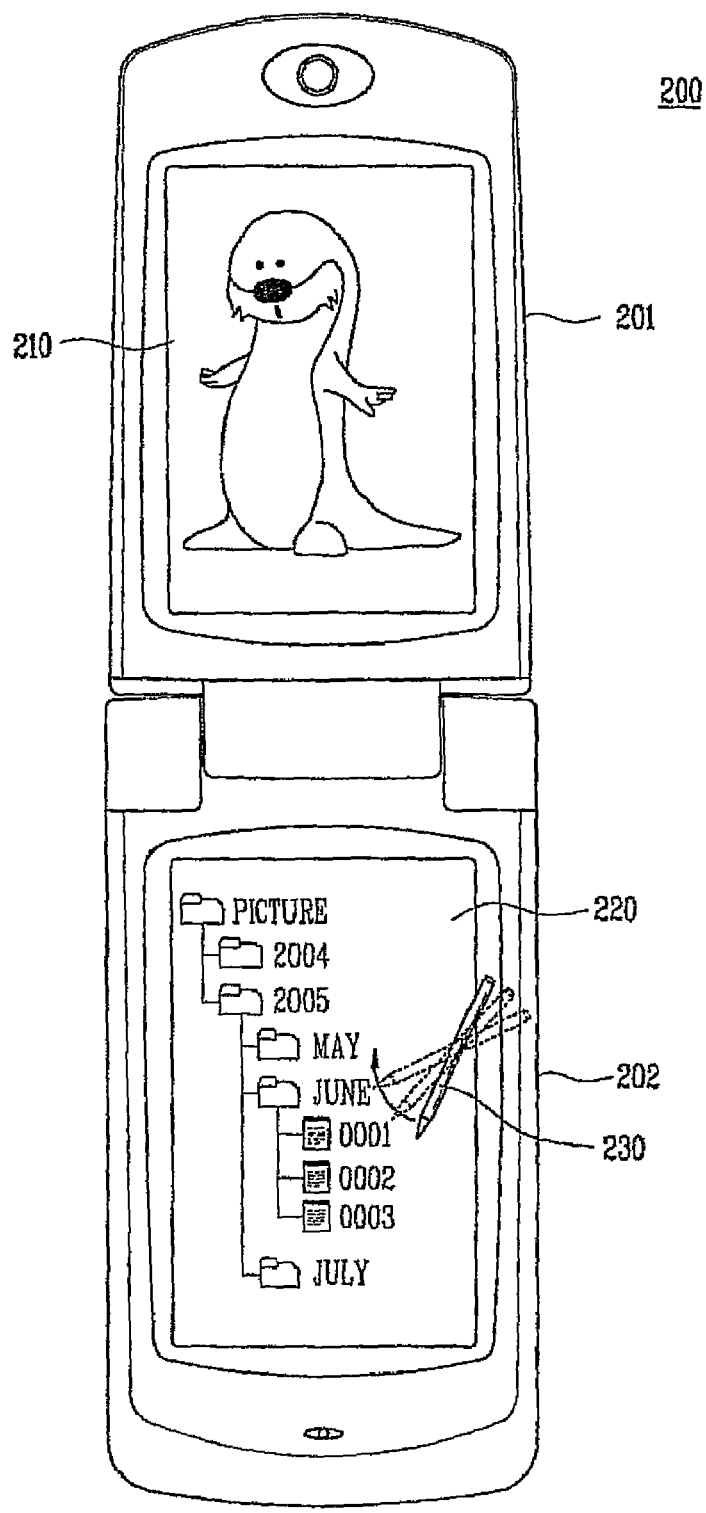
Figure 7B:
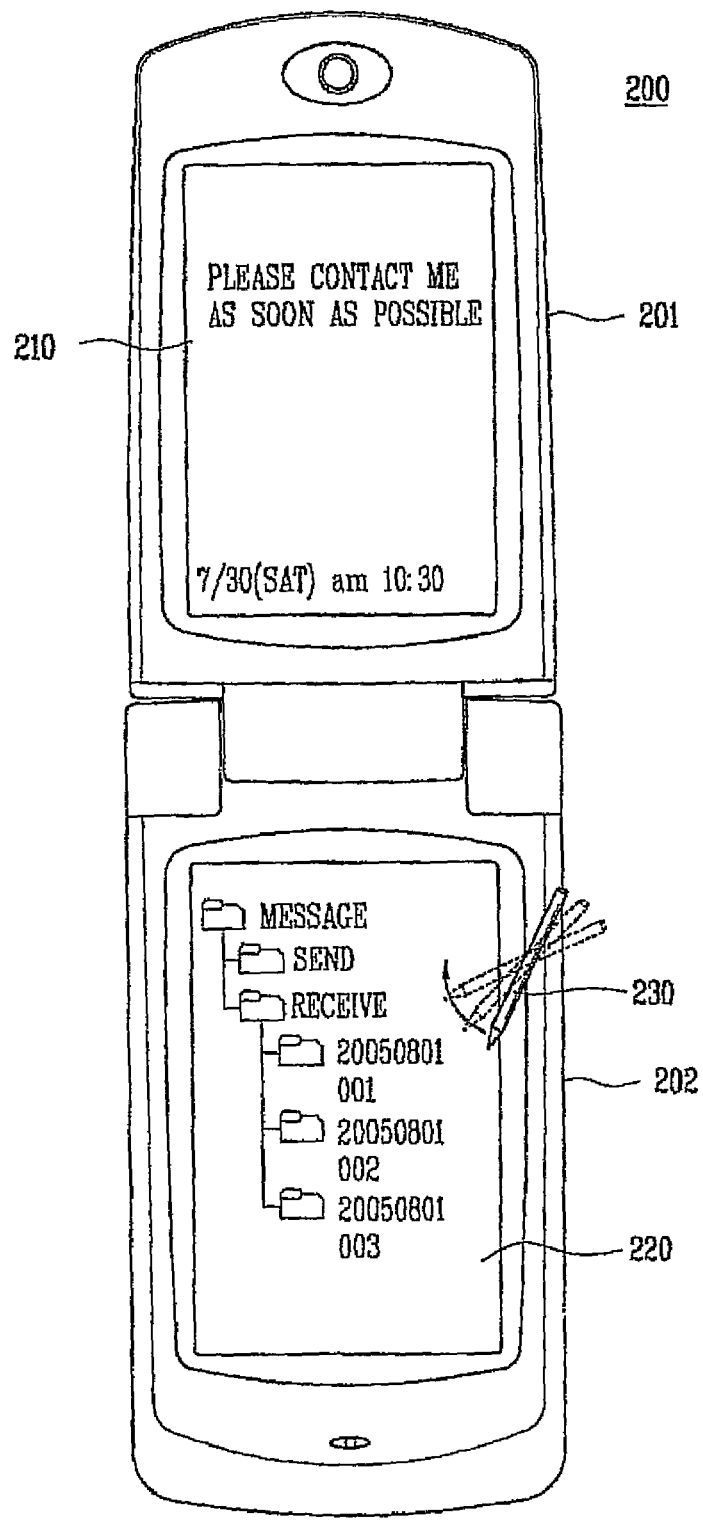

FIGS. 7*a* to 7*j* show various examples of outputting data on the touch panel through a different display in accordance with the present invention. FIGS. 7*a* and 7*b* show transfer of an image to a different display region by using the stylus pen in a state that an explorer screen is displayed on the touch panel formed on the lower folder. That is, the stylus pen is moved toward the upper folder at a certain speed. In this case, an arbitrary menu (or icon) is an image file name or a document-stored file name. As shown in FIG. 7*a*, an image of the corresponding file is displayed on the upper folder, or as shown in FIG. 7*b*, content of the corresponding document is displayed.

Figure 7C:
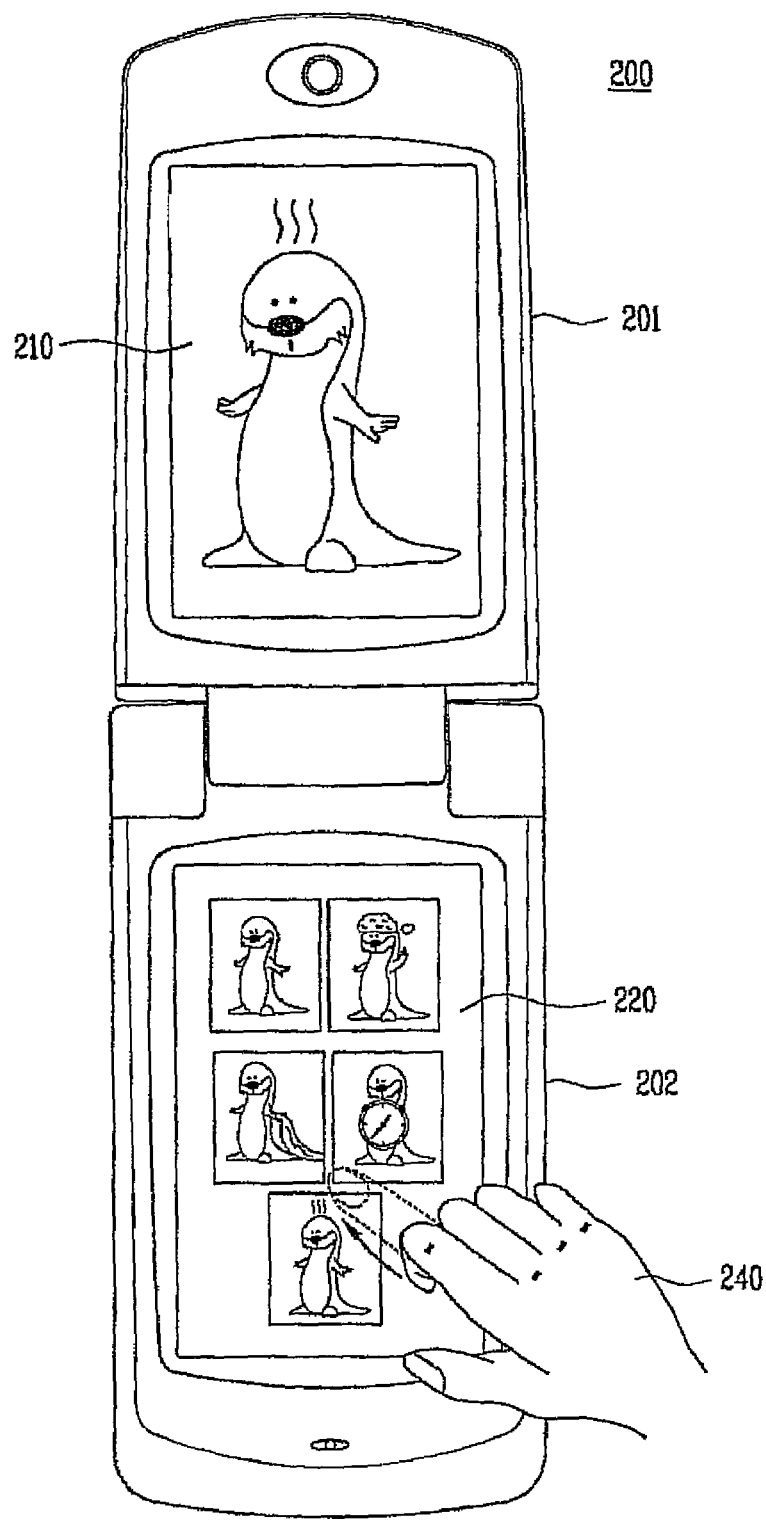

FIG. 7*c* shows an example of a display in accordance with a different embodiment of the present invention. In a state that a plurality of thumbnail type images are displayed on the display region of the lower folder formed as the touch panel, a crooked finger that is selecting an arbitrary image is put forth upward in a bouncing manner. Also, in this case, likewise in the case where the stylus pen is used, a thumbnail image of the lower folder is displayed as a magnified image through the display region of the upper folder.

Figure 7D:
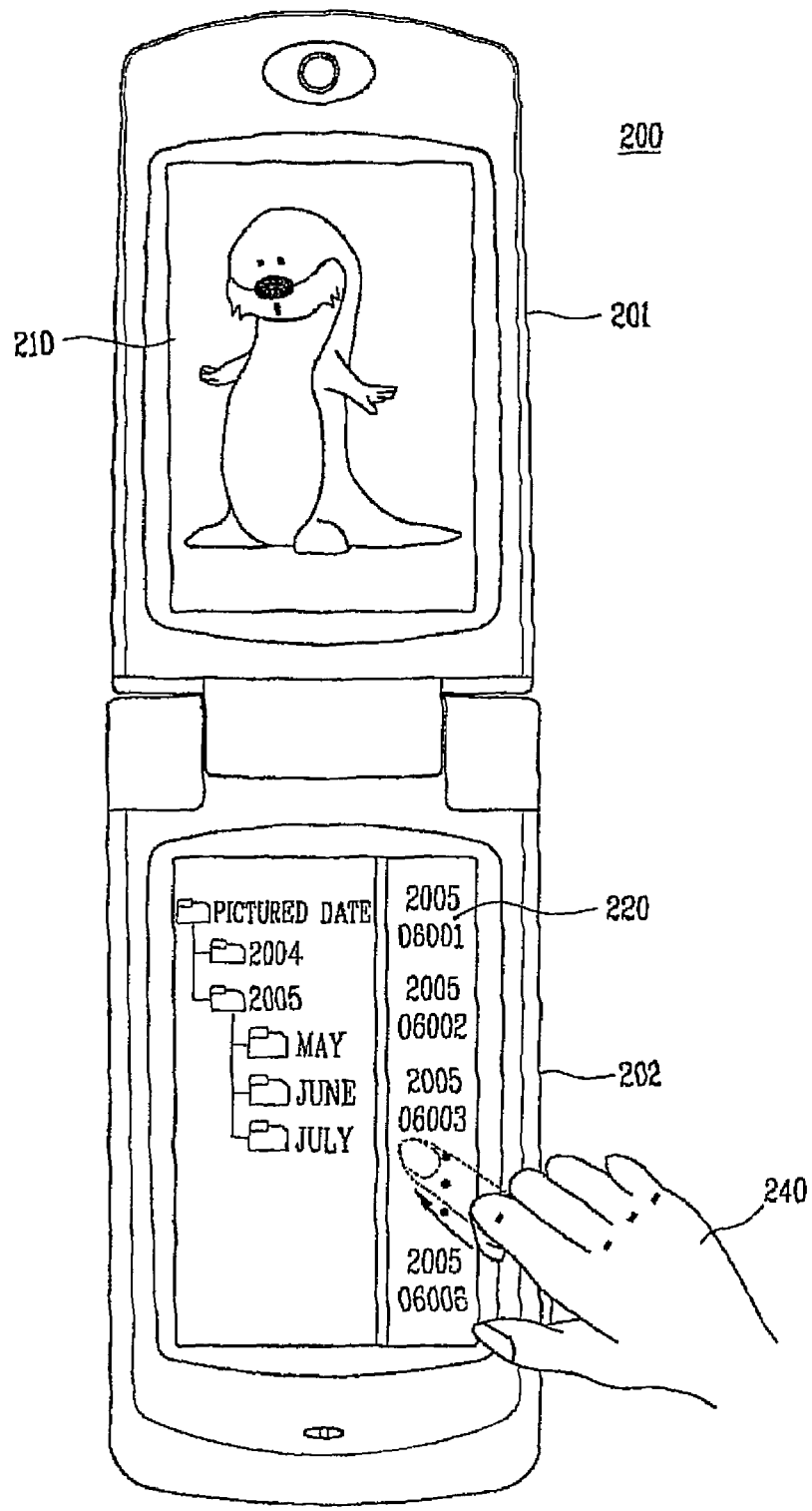

FIG. 7*d* shows a case that the lower folder display is implemented in a general computer. That is, the display region of the lower folder is divided into two regions. In the similar manner, data can be moved from the left to the right region of the lower folder, or data of the lower folder can be moved to the upper folder. As a matter of course, the same principle as described above is applied to the movement method in this case.

Various games can be implemented by using the dragging direction and the movement speed of the pointing device at one region formed as the touch panel among the two display regions according to the concept of the present invention. For example, the user can play a game such that when an arbitrary icon moves at an arbitrary speed on the display region of the upper folder, the pointing device at the lower folder is instantly bounced toward the corresponding icon. Namely, the present invention can be applicable to games for which a movement speed and direction work as an important factor, such as bowling, a soccer game, a pool game or a shooting game.

FIGS. 7e to 7h show examples of games to which the principle of the present invention is applied.

Figure 7E:
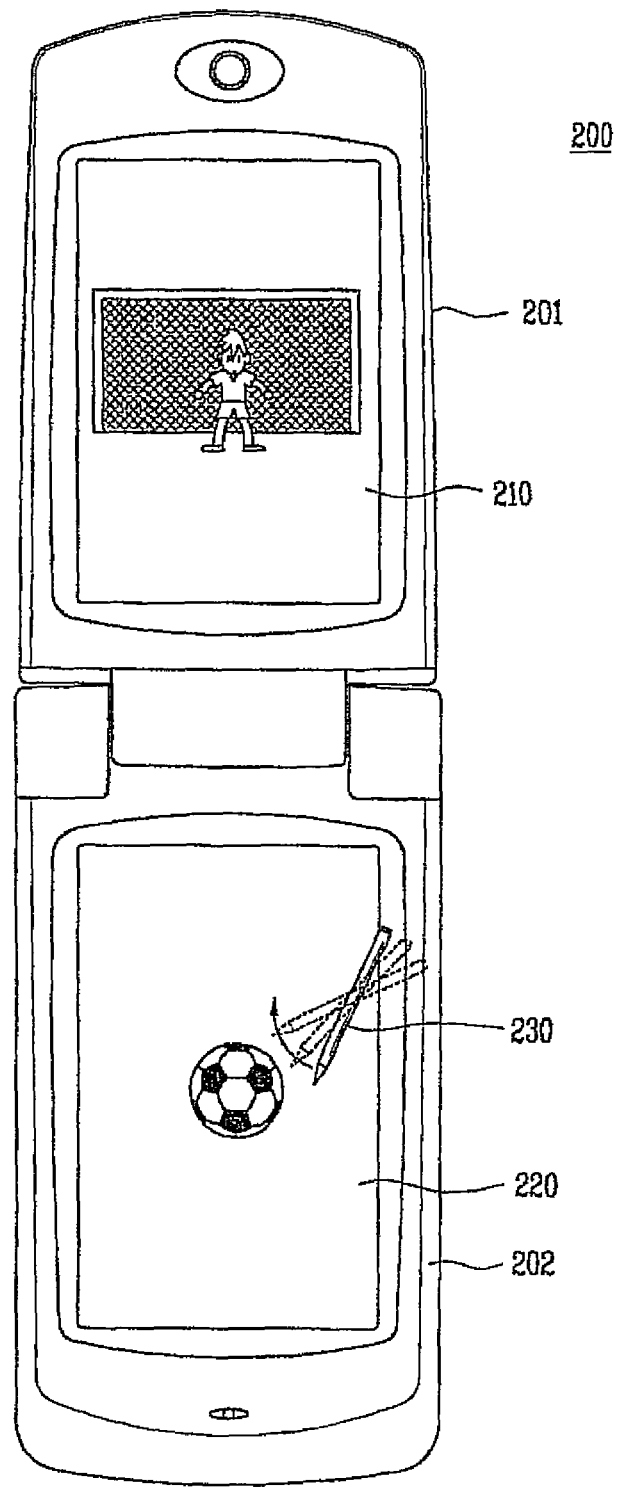
Figure 7F:
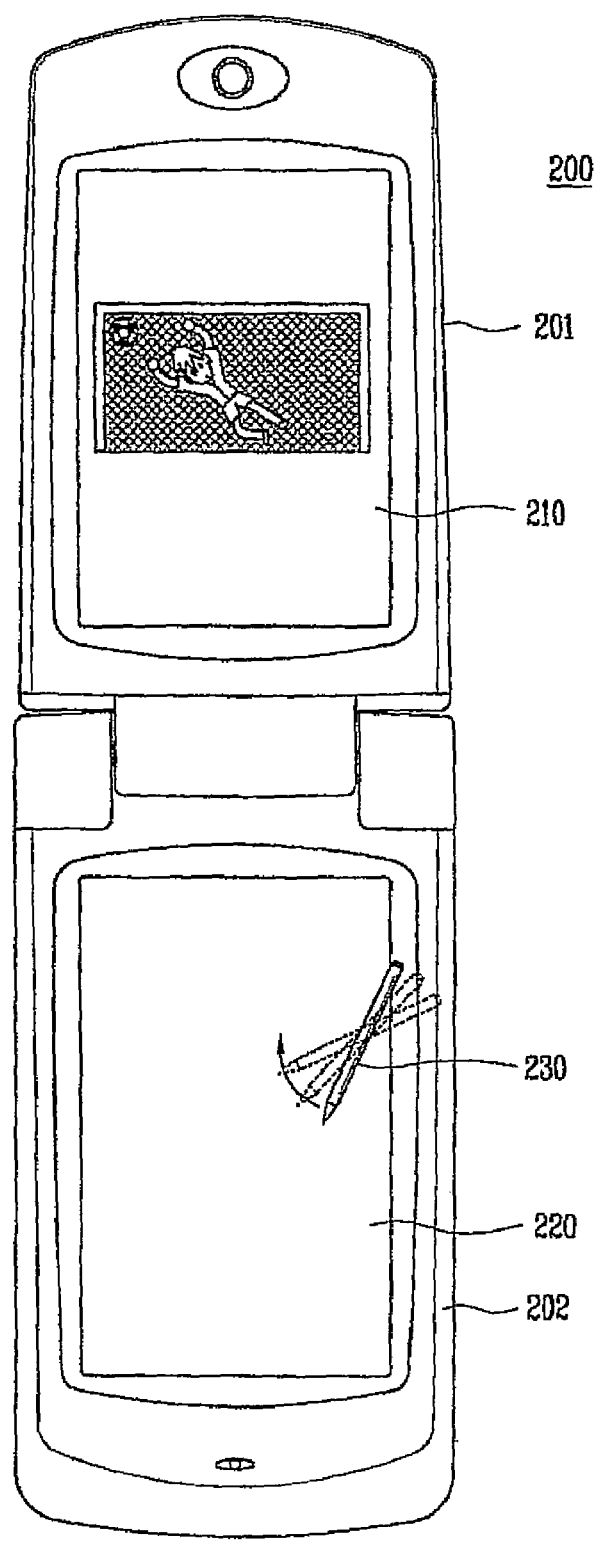
Figure 7G:
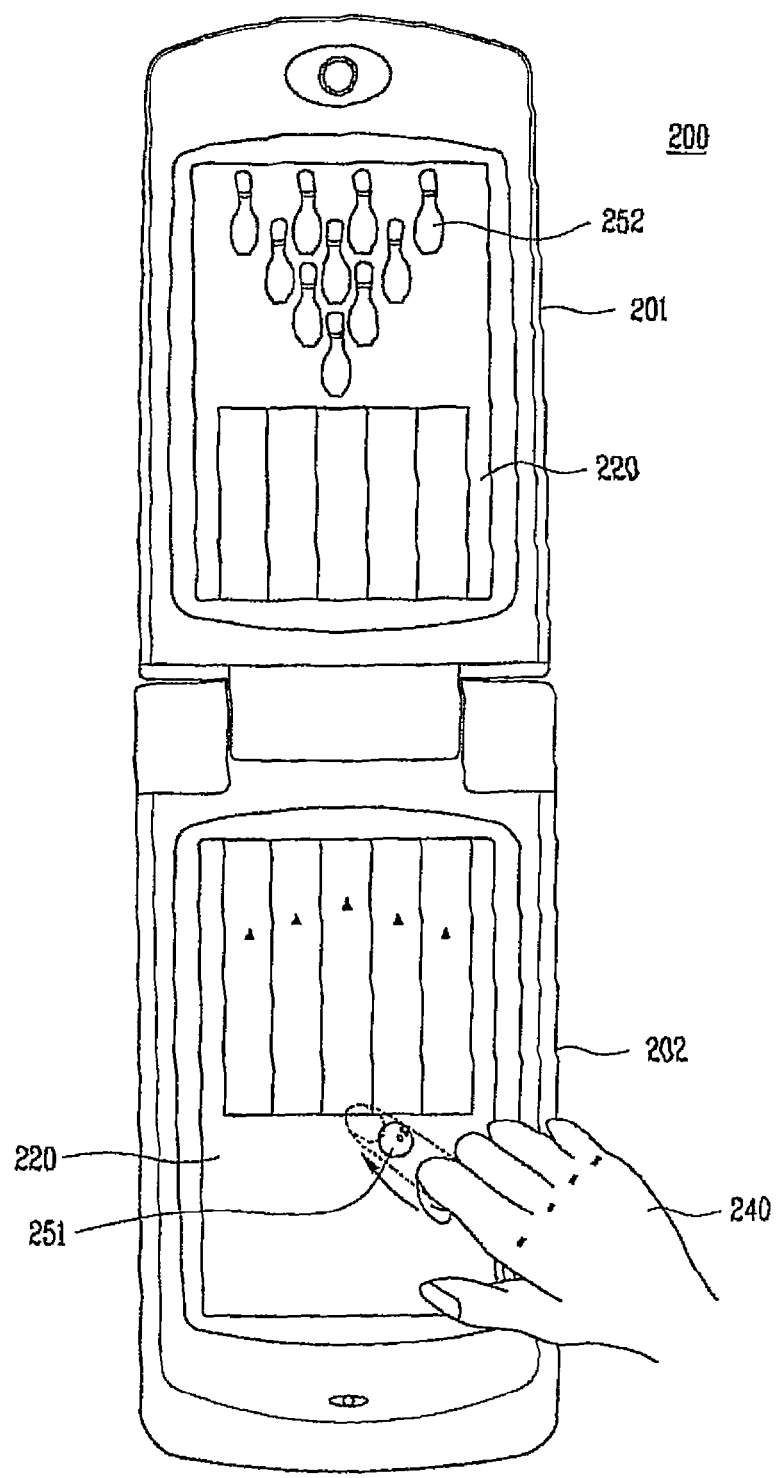
Figure 7H:
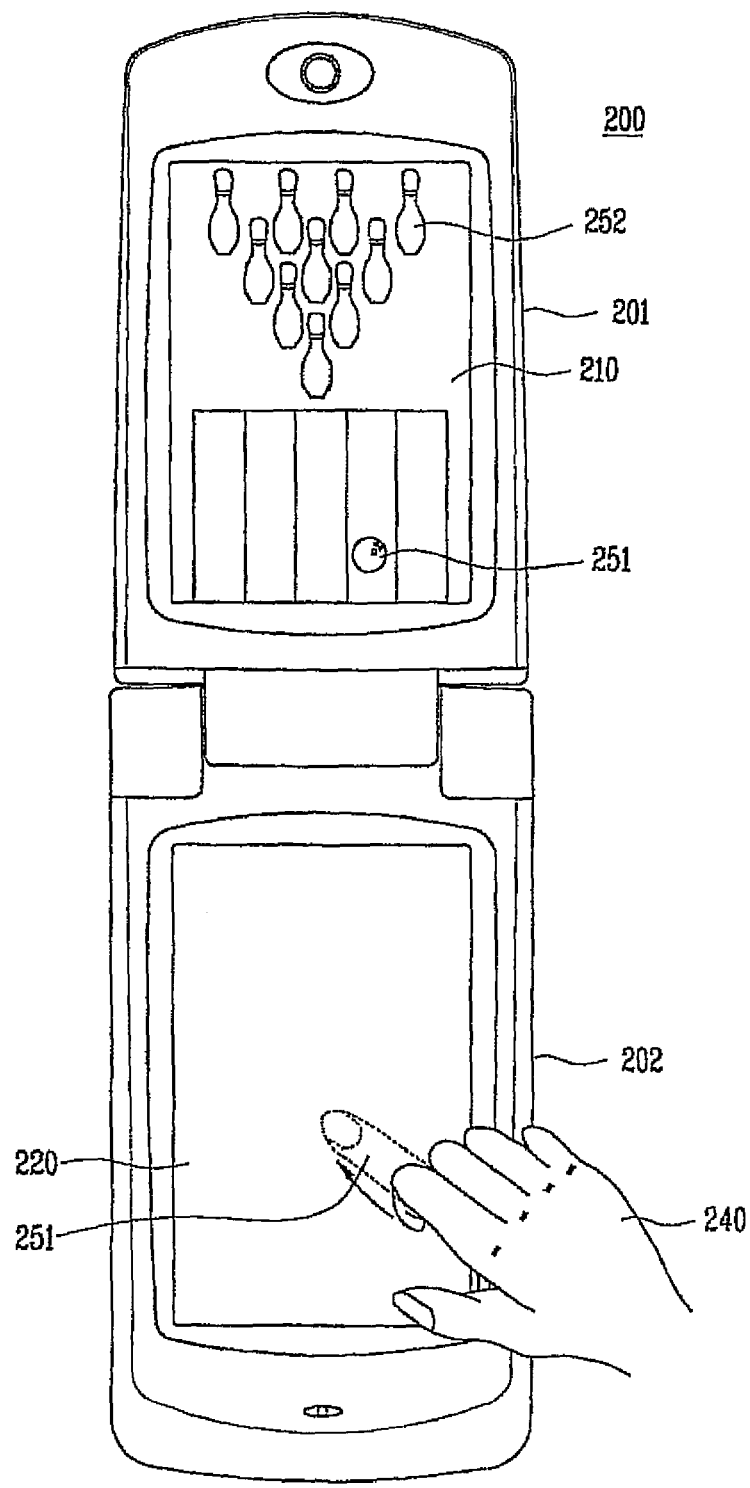
Figure 71:
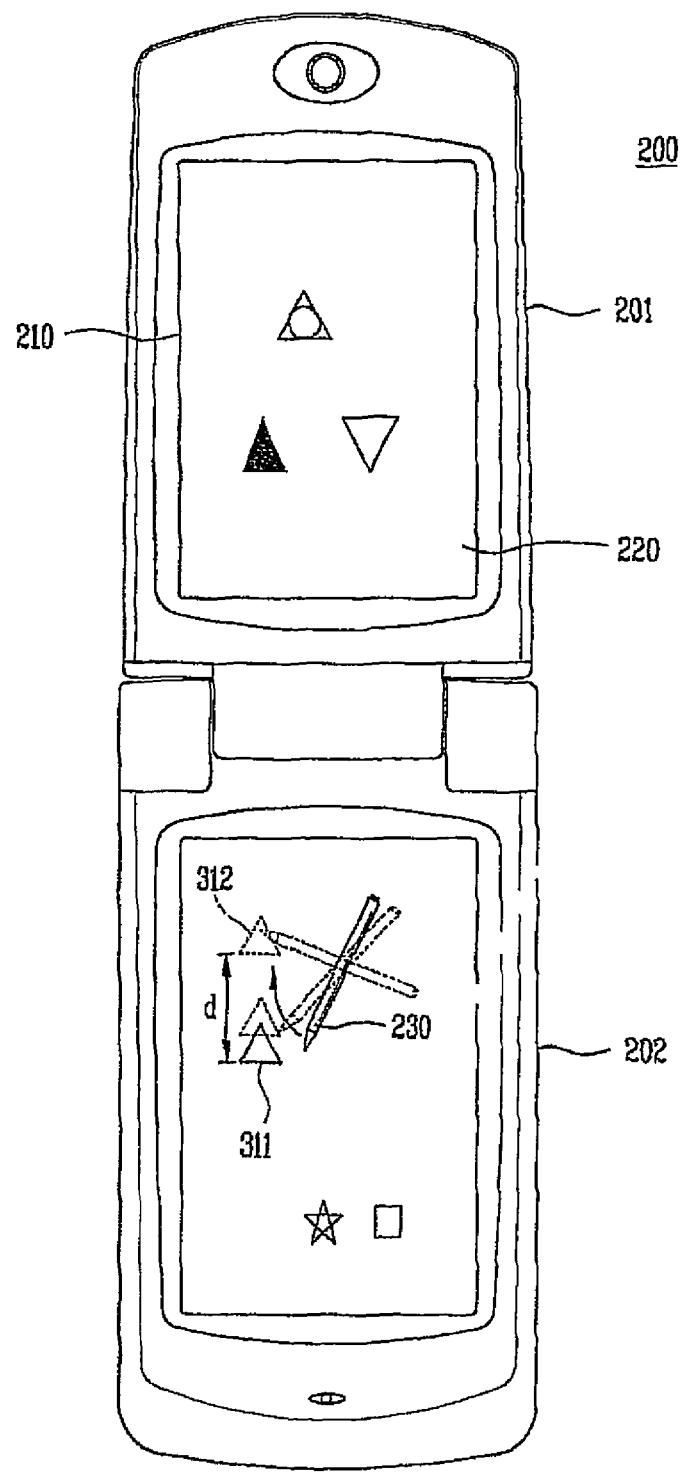

First, as shown in FIGS. 7e to 7g, a soccer ball or a bowling ball displayed on the touch panel can be displayed on the display of the upper folder according to an operation of the stylus pen or a movement of fingers as shown in FIGS. 7f to 7h. Not simply displaying the same images, but the soccer ball or the bowling ball are moved from the lower folder to the upper folder and displayed. In this case, it is assumed that the dragging direction of signals inputted through the touch panel or calculation of a speed of movement can be performed by the controller.

Figure 7J:
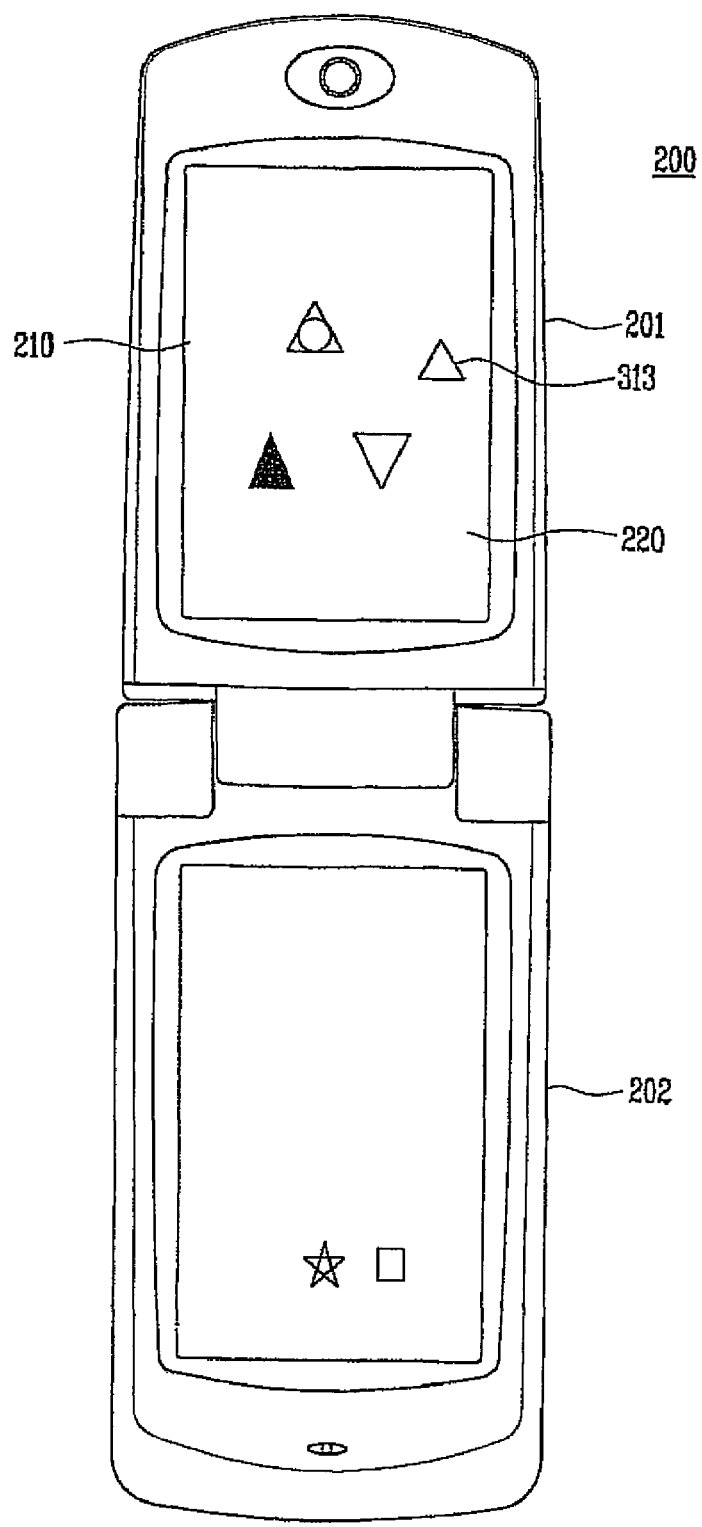

FIGS. 7i and 7j shows examples for explaining an operational principle of the present invention. As shown in FIG. 7i, data 311 is selected and moved as long as 'd' by using the stylus pen 230. In this case, the controller checks whether the movement distance (d) satisfies conditions. In order to discriminate it from data movement on the same display, a movement mode or a menu for movement must be first set. Namely, in general, data movement on the touch panel is preferentially considered, but an additional mode or menu can be set to implement the operations of the present invention. The moving data 312 is displayed so long as the stylus pen 230 contacts on the touch panel 220. Namely, when the stylus pen 230 becomes off the touch panel 220 after performing dragging for a certain distance, as shown in FIG. 7j, the data 313 is moved to be displayed on the upper display unit 210.

FIGS. 8a to 10c show various examples of outputting data on the touch panel through the other display and substantial data movement in accordance with the present invention.

Figure 8A:
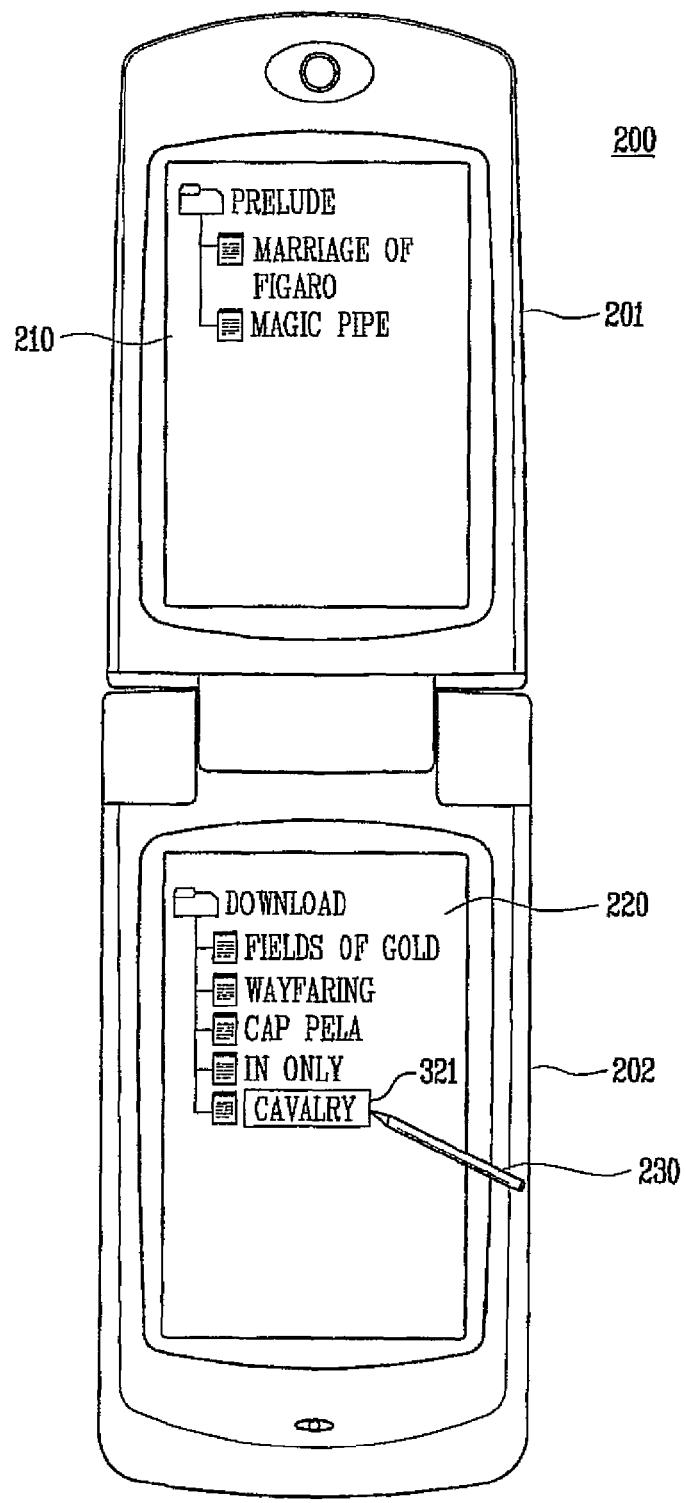
FIGS. 8a to 10c show various examples of outputting data on the touch panel through a different display in accordance with the present invention.

First, with reference to FIG. 8a, different directory information is displayed on the touch panel 220 of the lower folder 202 and the display unit 210 of the upper folder 201. Arbitrary data 321 on the touch panel 220 is selected by using the stylus pen. In this case, a target directory to which the data 321 is to be moved should be displayed on the display unit 210 of the upper folder 201.

Figure 8B:
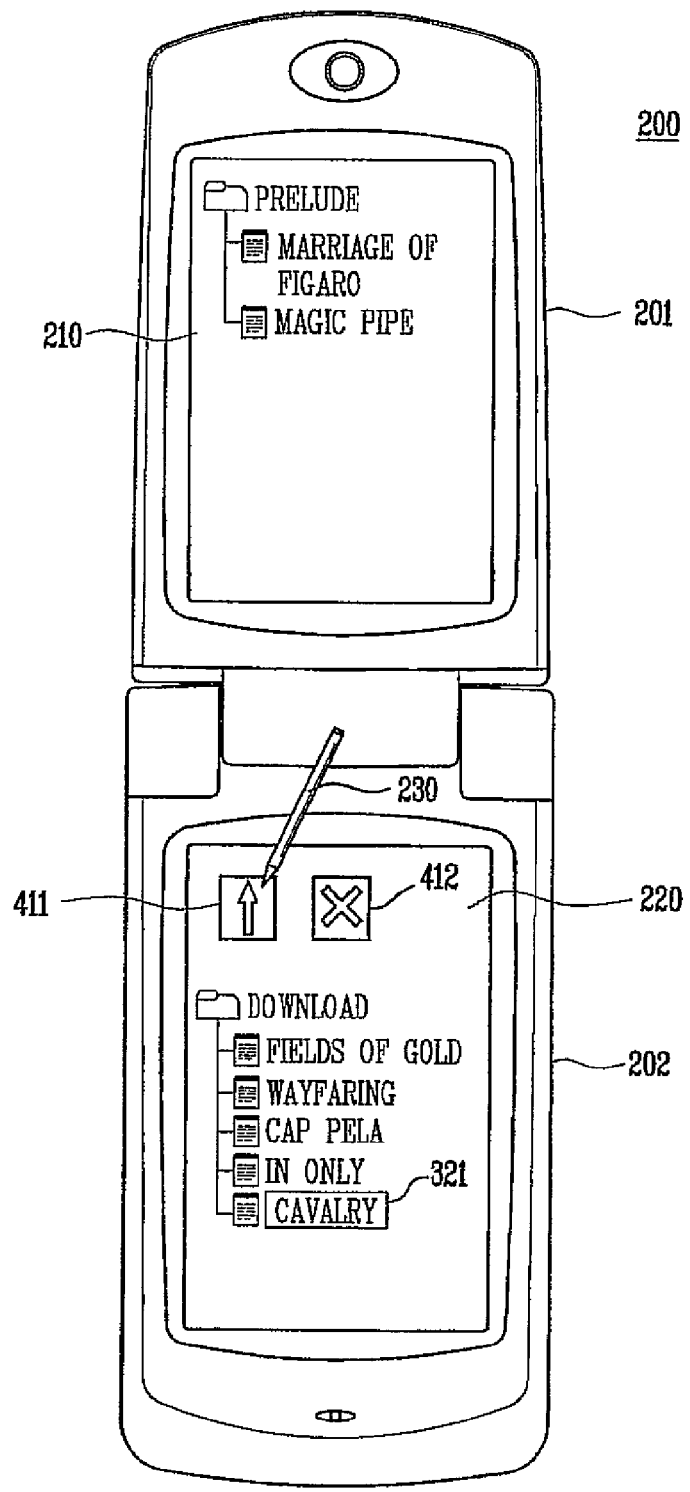
Figure 8C:
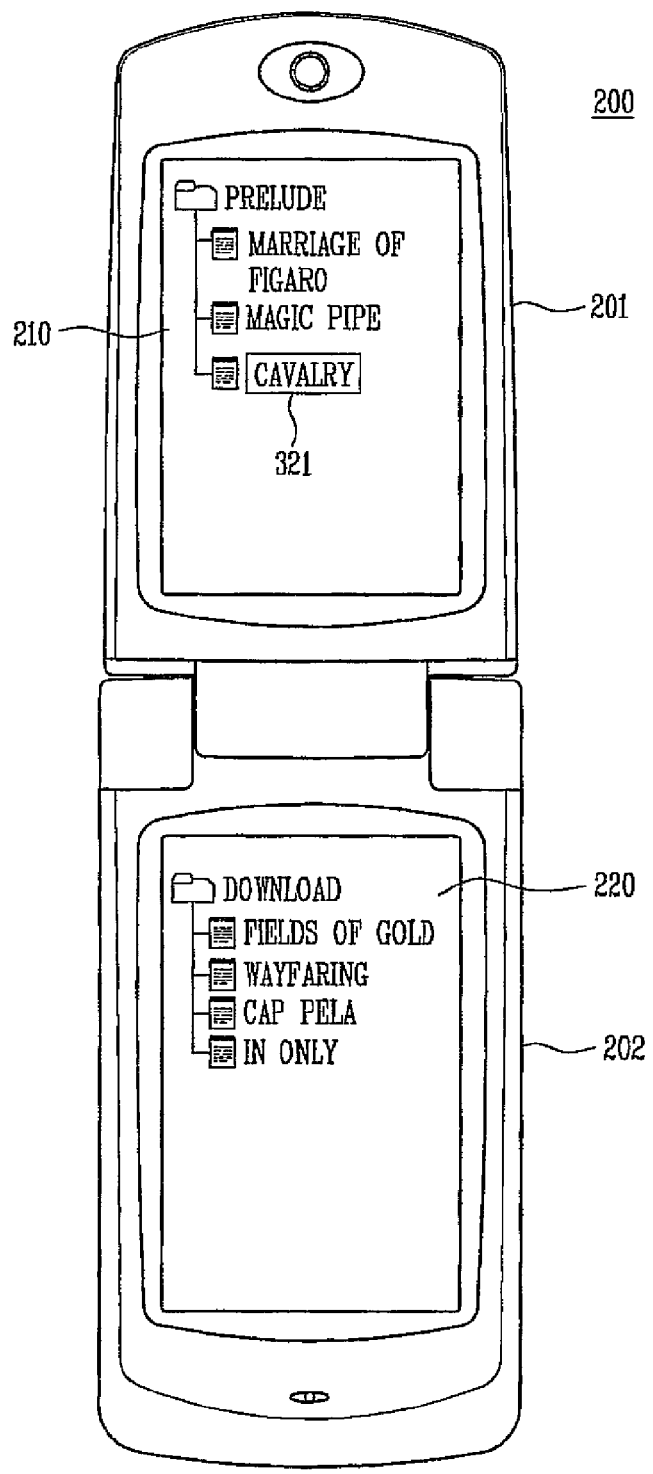

When the arbitrary data is selected, an arrow mark 411 and a delete mark 412 appear as shown in FIG. 8b. According to circumstances, these marks can be previously displayed. The arrow mark 411 is selected by using the stylus pen 230. Then, the selected data 321 is moved from a 'download' directory to a 'prelude' directory as shown in FIG. 8c. This movement is displayed through the display unit 90 of the upper folder 201.

Figure 9A:
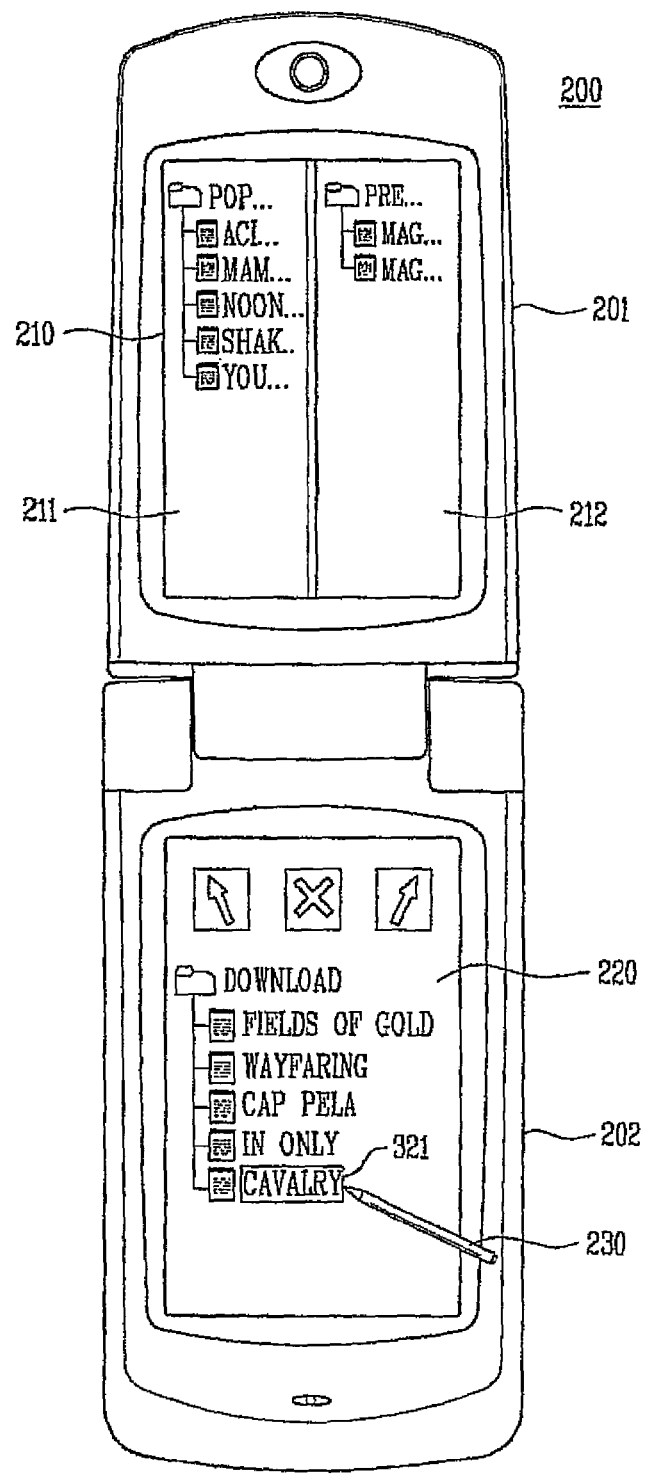
Figure 9B:
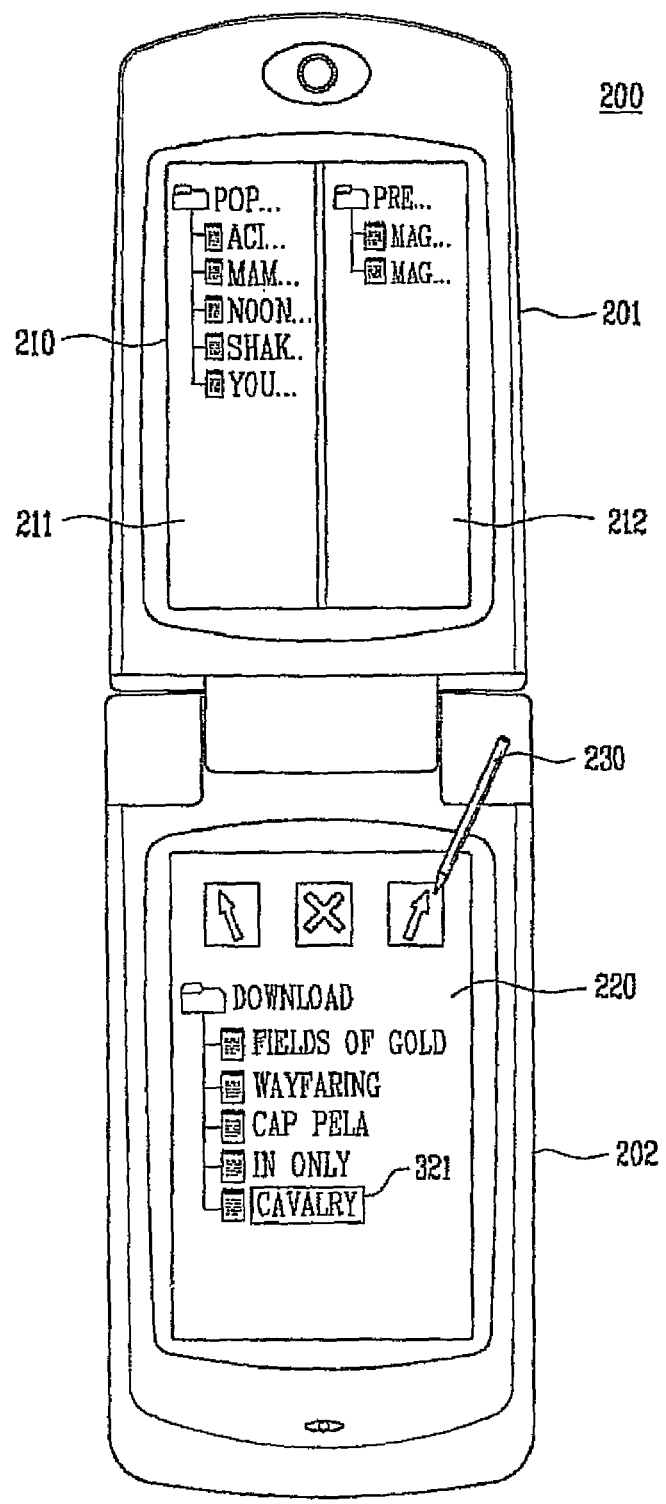
Figure 9C:
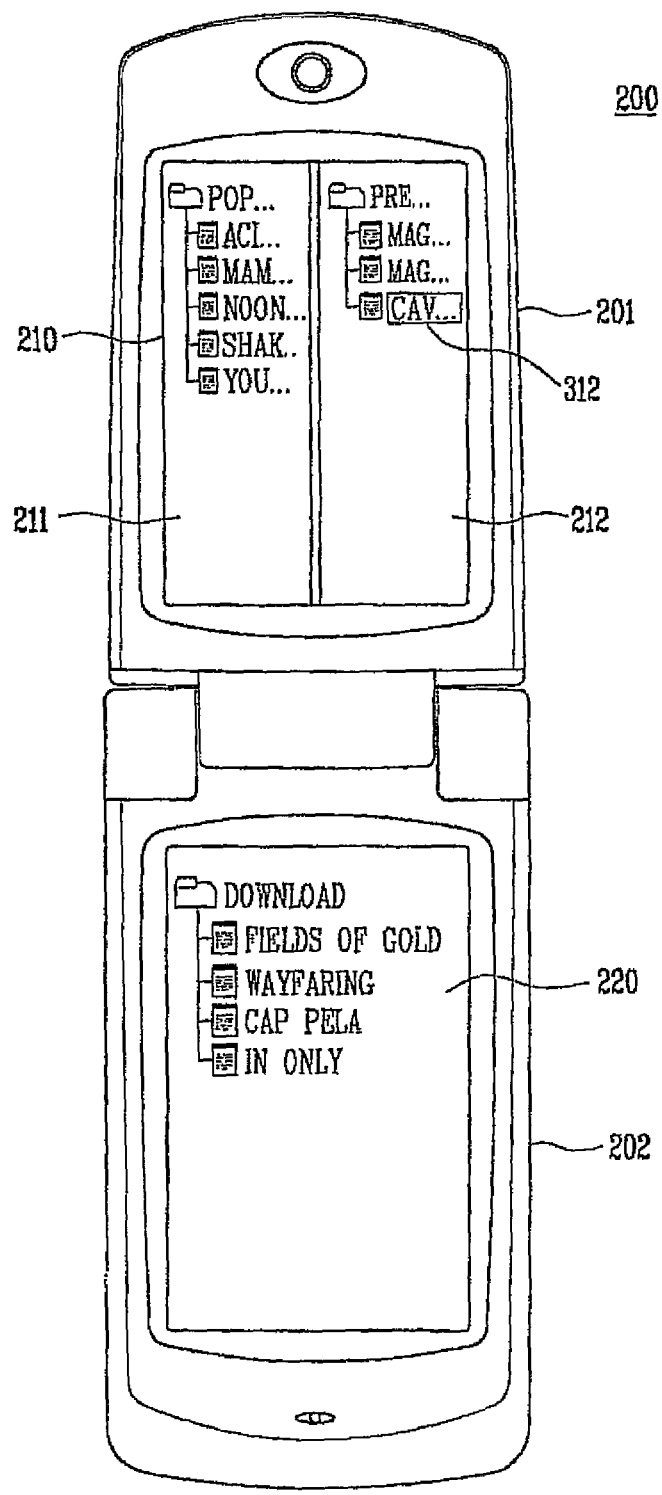

With reference to FIG. 9a, there can be a case where different destinations is should be simultaneously displayed on the display unit 90 of the upper folder 201. Namely, two screens 211 and 212 showing different paths can be displayed on the single display unit 90. The movement target data 321 is selected by using the stylus pen 230. The selected data 321 has a different color from other data. Subsequently, as shown in FIG. 9b, the arrow mark or the delete mark is selected according to a destination for movement. In the present embodiment, the selected data is moved to the directory of 'prelude' displayed on the right portion of the screen of the display unit 90. Accordingly, as shown in FIG. 9c, a 'cavalry' file of the 'download' directory has been moved to the directory of 'prelude'.

In the above-described embodiment of the present invention with reference to FIGS. 8a to 9c, the data is moved by using the arrow mark indicating the direction. In this respect, if an additional mode or menu has been set, data can be substantially moved by using an independent condition or collective conditions such as the drag distance, pressure, the number of times, time or speed on the touch panel. In this case, if there are two or more destinations, the direction of dragging should be sensed.

Figure 10A:
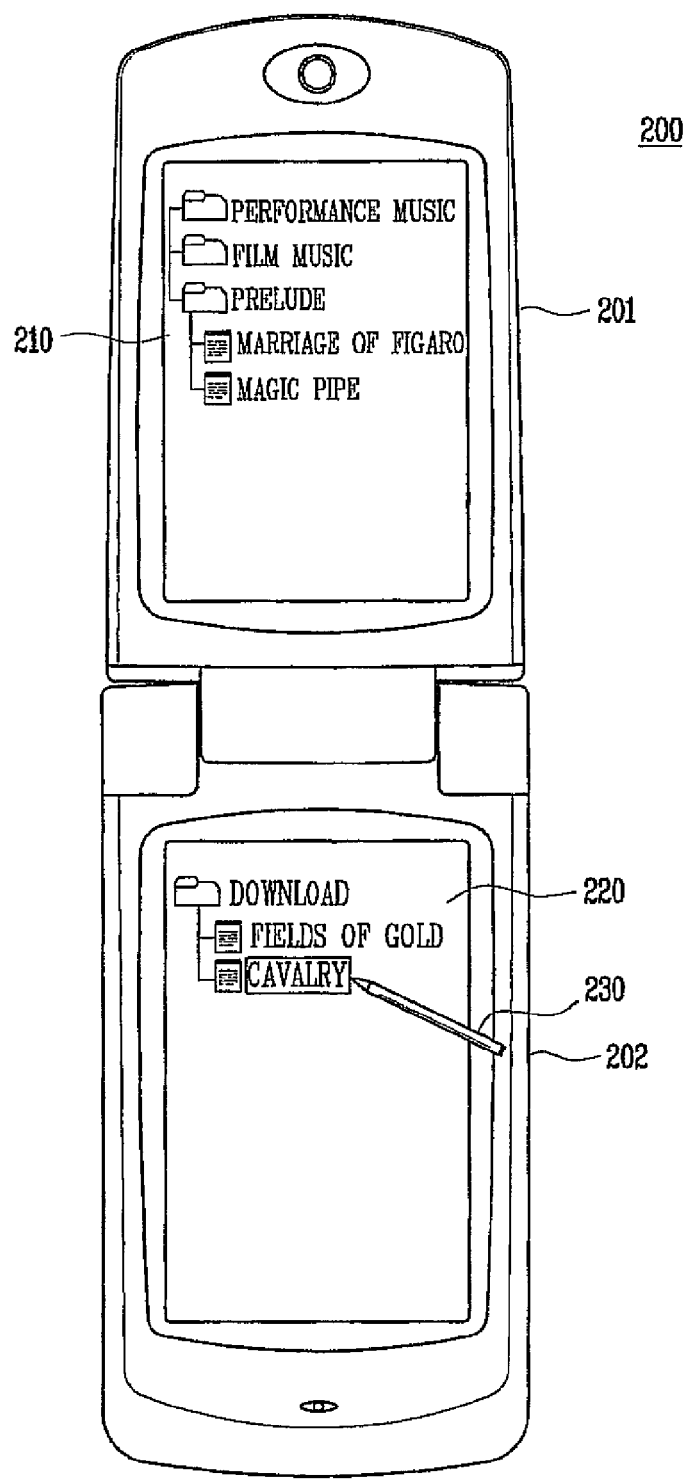

In a different embodiment of the present invention, as shown in FIG. 10a the display unit 90 is formed as a touch panel. Data 321, a target to be moved, is selected from a list of data displayed on the touch panel 220 of the lower folder 202 by using the stylus pen 230. In this case, in order to discriminate the selected data, the data is displayed in a different color from other data.

Figure 10B:
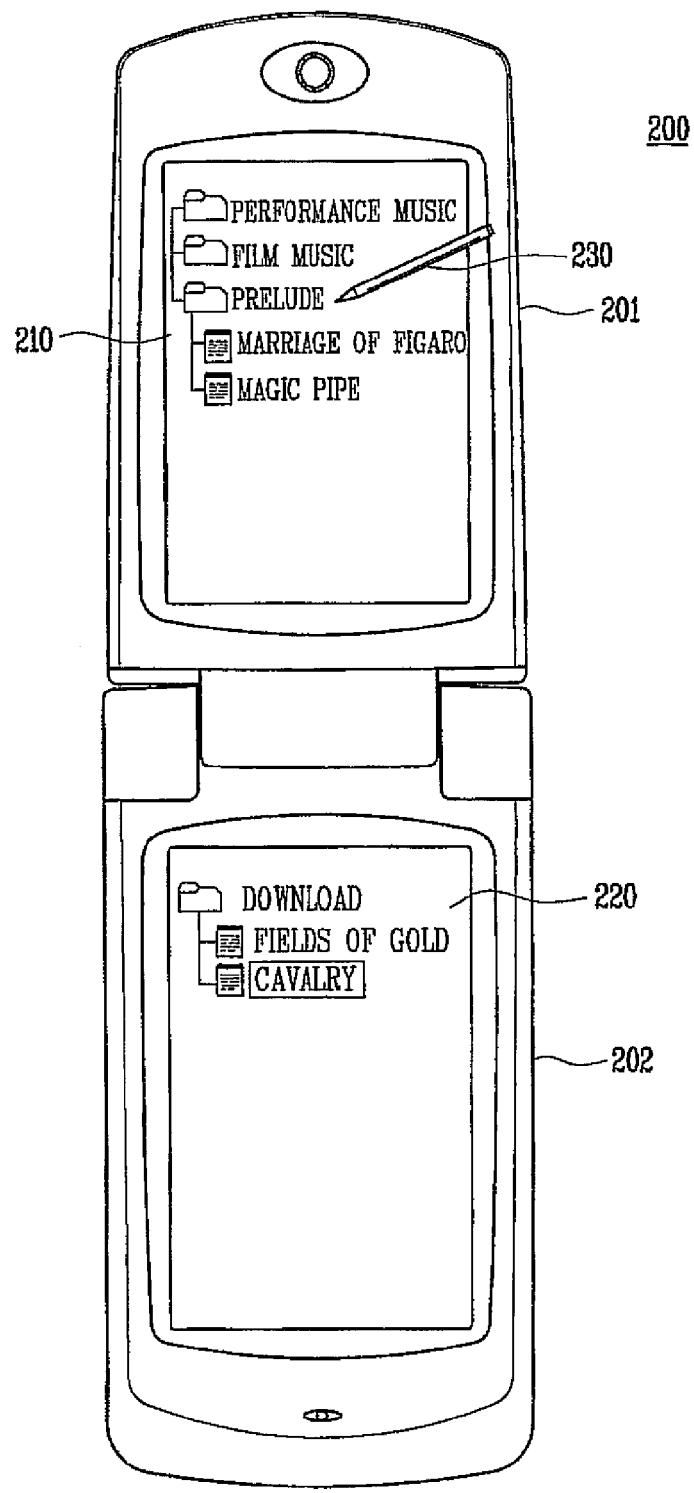
Figure 10C:
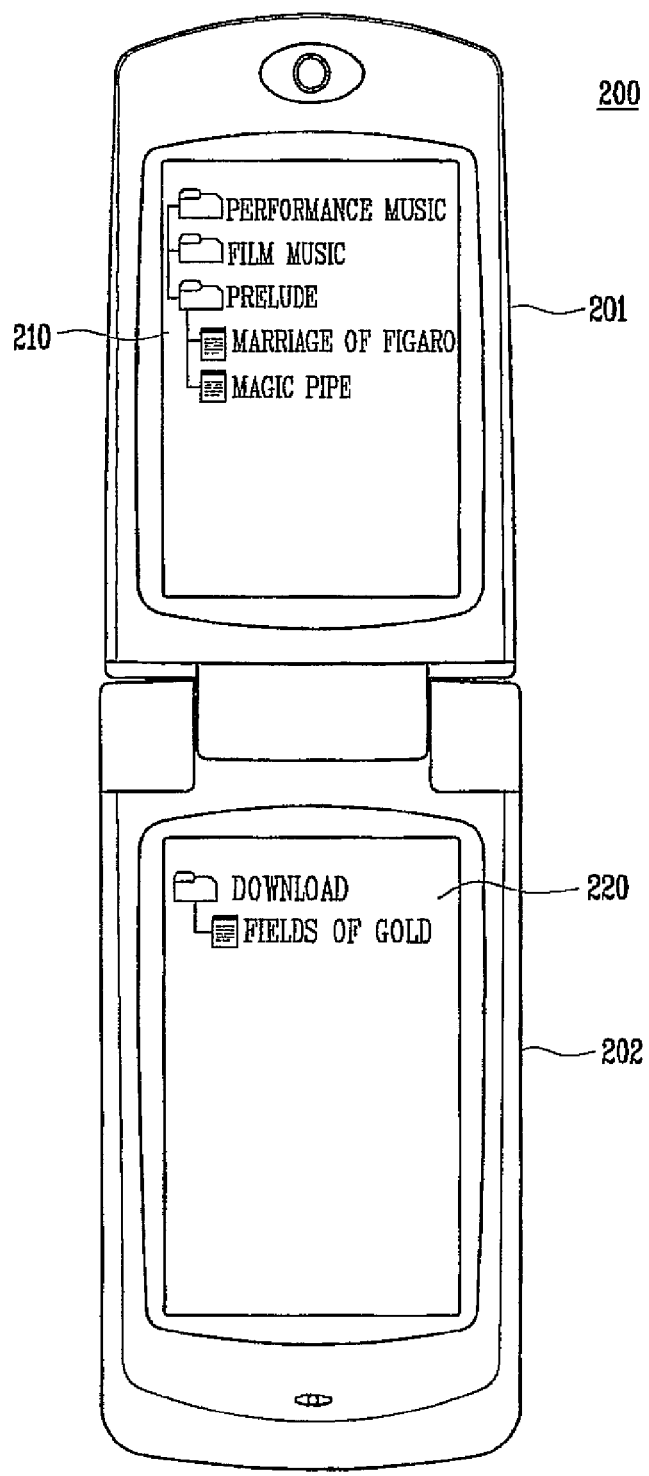

Thereafter, as shown in FIG. 10b, a destination is selected from the data list screen displayed in a tree structure on the touch panel 210 of the upper folder 210 by using the stylus pen 230. In this embodiment of the present invention, the data 'cavalry' is selected from the 'download' directory and then moved to the 'prelude' directory. As a result, as shown in FIG. 10c, it can be noted that the data 'cavalry' 321 has been moved from the 'download' direction to the 'prelude' directory. For user's clear recognition, the movement of data on the lower touch panel 220 and the upper touch panel 210 can be displayed as a slow motion in a panorama form as necessary.

Figure 11:
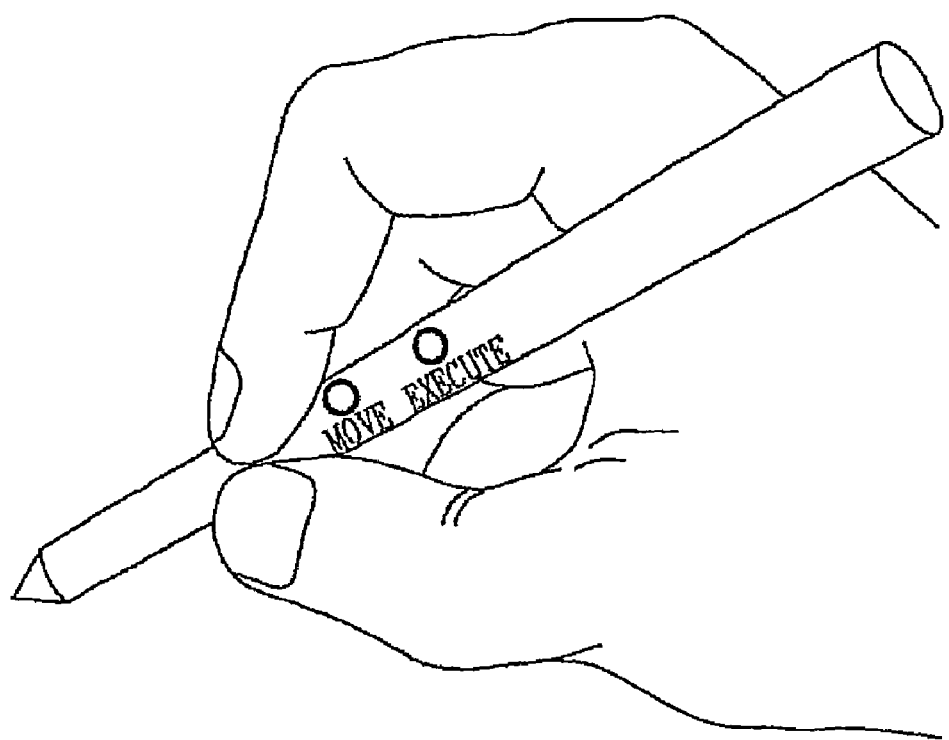
FIG. 11 is an exemplary view showing a modification of a stylus that can be applied in the present invention.

According to circumstances, if the stylus pen includes particular buttons (a functional button and a hot key) for movement and execution as shown in FIG. 11, the selected data can be executed through a different display unit or moved to a destination displayed on the display unit by means of the stylus pen. In this case, the stylus pen must be set in advance to perform wired/wireless communication with the terminal Here, a wired interface may be achieved via data connection line, and a wireless interface may be achieved via Wi-Fi, Wi-MAX, Wi-BRO, a wireless broadband connection, or other types of technology that can handle data information communication. Also, said functional button may be mounted on a side of the mobile communication terminal so that the user can push the functional button while holding the terminal with one hand. The input device of foregoing embodiments are explained only with the stylus or user finger, however, the image manipulation illustrated in hereinabove may be executed with other type of audible, visual, and/or tactile input manner.

If one display region is displayed in a form of a thresh box, data deletion can be easily processed. Namely, a series of general processes of pressing a right button of a mouse to fetch to display a pop-up menu, checking whether to delete particular data, receiving an acknowledge signal, and processing it can be omitted to delete the data.

Also, during the data processing of the presented invention, automatic pause and save function may be applied to prevent unexpected interruption (e.g. a short message service (SMS), and a multimedia message service (MMS), a graphic message, a voice message . . . etc) from other user.

Various modifications of the present invention can also be applied based upon the basic concept of the presented invention.

Usually, due to the particular characteristics of a mobile communication terminal, various aspects, such as mobility, limited processor capabilities, restricted memory size, restrictions on battery power consumption, a relatively small-sized display screen, etc., need to be considered when implementing the present invention with consideration of a balance of all these aspects mentioned above.

As to the limited capability of memory in mobile communication terminal, it can be understood that the amount of moved or copied image file size being stored or display attributes [e.g. resolution] representing the moved or copied image may need to be restricted. For example, the image resolution or data file size of the moved or copied image may be reduced (compressed) for storage so that more content can be stored into the memory. Although the image resolution may be degraded somewhat, the user may nonetheless be satisfied that he or she may save more manipulated images into terminal storage and may retrieve a specific image quickly compare to an image having a large file size. It is also required to restrict numbers of thumbnails or image editing functional menus or icons shown in display screen because of the limited size of the display screen in mobile communication terminal. For example, one can not able to recognize the images properly when large number of thumbnails shown in small-sized display screen of mobile communication terminal. Also, due to the limitation of size of the display screen mounted in the mobile terminal, It can be understood that a terminal with a single display screen, which divides the single display screen into more than two portions, could perform equivalent function of the presented invention's dual display mobile communication terminal, as such any arbitrary images, shown in a first portion of a display screen, which are to be moved or be copied could shown in other portion of display screen with modified version of images.

The various features of the present invention may be further described and explained in the following manner. Note that the element reference numbers have not been specified, but may be clearly understood upon viewing the drawings and this overall disclosure.

The present invention provides a mobile communication apparatus, comprising: a transceiver to transmit and receive data; a memory to store the data from the transceiver or from an external source; a body with a first display unit and a second display unit, wherein at least one of the first and second display units allows touch sensitive inputting; a display processor to display a first graphical element on the first display unit that allows touch sensitive inputting; a input detector to detect a type of input received via the touch sensitive inputting; a graphical processor to process the first graphical element according to the detected type of input; and the display processor to display a second graphical element on the second display unit according to the processing.

The body can be opened such that two or more display units are visible, and closed such that only one or no display unit is visible and/or the body can be unfolded such that two or more display units are visible to a user or folded such that neither display unit is visible to the user. Here, the first graphical element may be a still-image obtained via an image capturing device that is attached with the body and/or the first graphical element may be obtained from video data stored in the memory previously or from streaming data transmitted from the external source. As briefly mentioned hereinabove, the first graphical element may be displayed in thumbnail image format, where a total number/size of the thumbnail images allowed to be displayed is based on a display capability (e.g. display attributes, memory size, processor power, battery power . . . etc) of the mobile communication device. The second graphical element may be manipulated versions of the original image that corresponding to a specified graphical icon, folder, menu, and/or file if the first graphical element is displayed in the form of a graphical icon, a menu, a folder and/or a file.

It can be understood that various image processing functions (not just image moving or image copying) can be applicable to the present invention, such as image manipulation, image modification, image composition, etc. And, such image processing functions may perform semi-automatic with minimal possible user's intervention. Furthermore, not just still image but many different types of image (e.g., still images, video clips, animation or other moving image) can be moved or copied.

The foregoing embodiments and advantages, which explained with figures, are merely exemplary and are not to be construed as limiting the present invention in one skilled in the ordinary art. The description of the present invention is intended to be illustrative, and not to limit the scope of the claims. Many alternatives, modifications, and variations will be apparent to those skilled in the art.

As so far described, the mobile communication terminal in accordance with the present invention has the advantage that data can be easily processed by sufficiently using the two display regions.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Additionally, even though it would be too numerous to list all the features and variations that can be implemented in mobile communication terminals to accommodate and support the recent trend towards convergence of electronic and/or digital devices, those skilled in the art would easily understand that elements (i.e., hardware, software, or a combination thereof) that are equivalent to the function units and/or modules described above may be implemented in the mobile communication terminal 100 in accordance with the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of selecting and moving at least one graphical object among graphical objects shown in multiple display regions, the method comprising:

detecting, via a single touch sensitive display unit, a touch input at a first location on a first display region of the touch sensitive display unit resulting in selection of a graphical object from the first display region of the touch sensitive display unit;

detecting, via the touch sensitive display unit, a drag input from said first location resulting in movement of the selected graphical object, wherein detecting the drag input is based on a drag distance from said first location to a second location on the first display region;

changing displayed locations of said graphical object on the first display region based on the drag distance;

changing displayed locations of said graphical object on the second display region based on the drag distance;

wherein the second display region is graphically adjacent the first display region on the touch sensitive display unit, and providing a visual indicator along an edge of the first display region or along an edge of the second display region on the touch sensitive display unit to indicate that the first display region and the second display region are attached to each other in a graphically continuous manner.

2. The method of claim 1, wherein the displayed locations of the graphical object on the first display region, on the second display region, or on both the first display region and the second display region, are based on the drag distance with respect to a pre-set length.

3. The method of claim 1, wherein the displayed locations of the graphical object on the the first display region and for the second display region are further based on a direction of the drag input.

4. The method of 3, wherein the displayed locations of the graphical object on the first display region and the second display region are further based on a drag movement velocity.

5. An apparatus that supports selecting and moving at least one graphical object among graphical objects shown in multiple display regions, the apparatus comprising:
a transceiver configured for transmitting and receiving signals via a wireless communications network;
a memory configured for storing data related to the signals and information related to graphical objects;
a single touch sensitive display unit comprising a first display region and a second display region; and
a processor configured for cooperating with the memory and the touch sensitive display unit in order to:
detect, via the touch sensitive display unit, a touch input at a first location on the first display region of the touch sensitive display unit resulting in selection of a graphical object from the first display region of the touch sensitive display unit,
detect, via the touch sensitive display unit, a drag input from said first location resulting in movement of the selected graphical object, wherein detecting the drag input is based on a drag distance from said first location to a second location on the first display region;
change displayed locations of said graphical object on the first display region based on the drag distance;
change displayed locations of said graphical object on the second display region based on the drag distance;
wherein the second display region is graphically adjacent the first display region on the touch sensitive display unit, and
provide a visual indicator along an edge of the first display region or along an edge of the second display region on the touch sensitive display unit to indicate that the first display region and the second display region are attached to each other in a graphically continuous manner.

6. The apparatus of claim 5, wherein the displayed locations of the graphical object on the first display region, on the second display region, or on both the first display region and the second display region, are based on the drag distance with respect to a pre-set length.

7. The apparatus of claim 5, wherein the displayed locations of the graphical object on the first display region and for the second display region are further based on a direction of the drag input.

8. The apparatus of claim 7, wherein the displayed locations of the graphical object on the first display region and for the second display region are further based on a drag movement velocity.

9. An apparatus comprising:
a transceiver configured to transmit and receive signals via a wireless communications network;
a memory configured to store data related to one or more icons;
a single touch sensitive screen configured to display at least one left side display area and at least one right side display area to achieve a side-by-side image layout; and
a processor configured to cooperate with the memory and the touch sensitive screen in order to display graphical outputs on the left and right side display areas by:
detecting, via the touch sensitive screen, a touch drag input resulting in movement of at least one touch selected icon, wherein detecting the touch drag input is based on a drag distance with respect to a threshold length;
providing updated graphical outputs on the left side display area of the touch sensitive screen to display the movement of the touch selected icon based on the drag distance; and
providing updated graphical outputs on the right side display area of the touch sensitive screen to display the movement of the touch selected icon based on the drag distance,
wherein the right side display area is graphically adjoined with the left side display area on the side-by-side image layout on the touch sensitive screen, and
providing a visual indicator along an edge of the left side display area, along an edge of the right side display area, or along edges of both the left and right side display areas to indicate that the left side display area and the right side display area are graphically adjoined on the side-by-side image layout.

10. The apparatus of claim 9, wherein the graphical outputs are provided on the left side display area, on the right side display area, or on both the left side display area and the right side display area are based on the drag distance with respect to the threshold length.

11. The apparatus of claim 9, wherein providing the graphical outputs for the left side display area and for the right side display area is further based on a direction of the drag input.

12. The apparatus of 11, wherein providing the graphical outputs for the left side display area and for the right side display area is further based on a drag velocity.

13. An apparatus comprising:
a display unit configured to provide outputs to a user and to receive touch contacts from the user, said display unit configured to display a first screen portion and a second screen portion, said first screen portion having a first display area and a second display area,
wherein a first set of graphical icons are displayed on the first screen portion and a second set of graphical icons are displayed on the second screen portion; and
a controller configured to cooperate with the display unit in order to cause,
detecting of an initial finger touch contact from the user applied at a particular spot on the first display area of the first screen portion resulting in selection of at least one graphical icon among the first set of graphical icons;
detecting of a continued finger touch contact from the user applied from the particular spot on the first display area of the first screen portion, the continued finger touch contact being a dragging motion performed with respect to the selected graphical icon from the particular spot towards a particular direction along the first display area;
displaying of the selected graphical icon as being moved with respect to the second display area, or moved with respect to the second display portion, or moved with respect to both the second display area and the second display portion due to the detected continued finger touch contact, based on a threshold length on the first display area for the dragging motion; and providing of a visual indicator that exists along an edge of the first display area, along an edge of the second display area, or along edges of both the first and second display areas, to indicate that the first display area and the second display area exist side-by-side to each other.

14. The apparatus of claim 13, wherein said controller is configured to cooperate with the display unit in order to cause displaying of the selected graphical icon based on the detected continued finger touch contact exceeding the threshold length.

15. The apparatus of claim 14, wherein said controller is configured to cooperate with the display unit in order to cause displaying of the selected graphical icon based on the detected continued finger touch contact not exceeding the threshold length.

* * * * *